(12) United States Patent
Roberts

(10) Patent No.: US 10,391,700 B2
(45) Date of Patent: Aug. 27, 2019

(54) RECYCLABLE PLASTIC STRUCTURAL ARTICLES AND METHOD OF MANUFACTURE

(71) Applicant: Richard W. Roberts, Tecumseh, MI (US)

(72) Inventor: Richard W. Roberts, Tecumseh, MI (US)

( * ) Notice: Subject to any disclaimer, the term of this patent is extended or adjusted under 35 U.S.C. 154(b) by 492 days.

(21) Appl. No.: 15/133,929

(22) Filed: Apr. 20, 2016

(65) Prior Publication Data
US 2016/0229149 A1   Aug. 11, 2016

Related U.S. Application Data

(60) Division of application No. 13/840,827, filed on Mar. 15, 2013, now Pat. No. 9,346,237, which is a
(Continued)

(51) Int. Cl.
*B29C 49/42*    (2006.01)
*B29C 49/04*    (2006.01)
(Continued)

(52) U.S. Cl.
CPC .......... *B29C 49/4273* (2013.01); *B29C 44/18* (2013.01); *B29C 44/343* (2013.01); *B29C 44/445* (2013.01); *B29C 49/0005* (2013.01); *B29C 49/04* (2013.01); *B29C 49/28* (2013.01); *B29C 49/58* (2013.01); *B29C 49/78* (2013.01);
(Continued)

(58) Field of Classification Search
CPC ... B29C 44/086; B29C 44/18; B29C 44/3426; B29C 44/445; B29C 49/04; B29C 49/4273; B29K 2105/04; B29K 2105/048; B32B 5/20; Y10T 428/233
See application file for complete search history.

(56) References Cited

U.S. PATENT DOCUMENTS

| | | |
|---|---|---|
| 776,342 A | 11/1904 | McCormick |
| 1,588,778 A | 6/1926 | Sorensen |

(Continued)

FOREIGN PATENT DOCUMENTS

| | | |
|---|---|---|
| EP | 0542302 | 5/1993 |
| EP | 0583542 | 2/1994 |

(Continued)

OTHER PUBLICATIONS

Website www.jsp.com, 2006, "Arplank, Expanded bead foam packaging materials, Material Properties, Auto/Mil Specs." 21 Pages.
(Continued)

*Primary Examiner* — Zachary L Kuhfuss
(74) *Attorney, Agent, or Firm* — Brooks Kushman P.C.

(57) ABSTRACT

The plastic structural article includes an elongated tubular shell having opposed end sections, a middle section there between and an interior cavity. The interior cavity has a foam core situated therein. The foam core comprises steam expandable polymer beads which when expanded substantially fill the interior cavity. The bead and shell are of a similar plastic composition enabling the articles to be reground and recycled. An apparatus for forming the articles and an associated method of manufacture are also disclosed.

11 Claims, 19 Drawing Sheets

Related U.S. Application Data continuation-in-part of application No. PCT/US2011/058119, filed on Oct. 27, 2011, which is a continuation of application No. 12/913,132, filed on Oct. 27, 2010, now Pat. No. 8,342,420.

(51) Int. Cl.

| | | |
|---|---|---|
| *B32B 1/08* | (2006.01) | |
| *E01B 3/44* | (2006.01) | |
| *E01B 9/36* | (2006.01) | |
| *E01F 9/588* | (2016.01) | |
| *B29C 44/34* | (2006.01) | |
| *B29C 49/78* | (2006.01) | |
| *B29C 44/18* | (2006.01) | |
| *B29C 44/44* | (2006.01) | |
| *B29C 49/28* | (2006.01) | |
| *B32B 27/06* | (2006.01) | |
| *B32B 27/08* | (2006.01) | |
| *B32B 27/32* | (2006.01) | |
| *B32B 3/04* | (2006.01) | |
| *E01F 9/529* | (2016.01) | |
| *B29C 49/00* | (2006.01) | |
| *B29C 49/58* | (2006.01) | |
| *B29C 49/46* | (2006.01) | |
| *B29K 105/04* | (2006.01) | |
| *B29C 49/60* | (2006.01) | |
| *B29L 31/06* | (2006.01) | |
| *B29K 23/00* | (2006.01) | |
| *B29K 25/00* | (2006.01) | |
| *B29K 101/00* | (2006.01) | |
| *B29K 501/00* | (2006.01) | |
| *B29L 31/10* | (2006.01) | |

(52) U.S. Cl.
CPC .......... *B32B 1/08* (2013.01); *B32B 3/04* (2013.01); *B32B 27/065* (2013.01); *B32B 27/08* (2013.01); *B32B 27/32* (2013.01); *E01B 3/44* (2013.01); *E01B 9/36* (2013.01); *E01F 9/529* (2016.02); *E01F 9/588* (2016.02); *B29C 44/3426* (2013.01); *B29C 2049/4691* (2013.01); *B29C 2049/6072* (2013.01); *B29C 2949/78025* (2013.01); *B29C 2949/78294* (2013.01); *B29K 2023/06* (2013.01); *B29K 2023/12* (2013.01); *B29K 2025/06* (2013.01); *B29K 2101/00* (2013.01); *B29K 2105/04* (2013.01); *B29K 2105/048* (2013.01); *B29K 2501/00* (2013.01); *B29L 2031/06* (2013.01); *B29L 2031/10* (2013.01); *B32B 2266/025* (2013.01); *B32B 2270/00* (2013.01); *Y10T 428/1372* (2015.01); *Y10T 428/1376* (2015.01)

(56) References Cited

U.S. PATENT DOCUMENTS

| | | | |
|---|---|---|---|
| 2,292,369 A | 8/1942 | Gordon | |
| 2,784,417 A | 3/1957 | Strand | |
| 2,983,963 A | 5/1961 | Jodell et al. | |
| 3,062,337 A | 11/1962 | Zittle | |
| 3,111,787 A | 11/1963 | Chamberlain | |
| 3,132,417 A | 5/1964 | Irwin | |
| 3,277,220 A | 10/1966 | Plymale et al. | |
| 3,389,195 A | 6/1968 | Gianakos et al. | |
| 3,400,429 A | 9/1968 | Ludwig | |
| 3,466,700 A | 9/1969 | Harrison | |
| 3,468,097 A | 9/1969 | MacK | |
| 3,563,845 A | 2/1971 | Stevens | |
| 3,598,312 A | 8/1971 | Hamilton | |
| 3,745,998 A | 7/1973 | Rose | |
| 3,774,968 A | 11/1973 | Fenton | |
| 3,813,040 A | 5/1974 | Heinemeyer | |
| 3,935,044 A | 1/1976 | Daly | |
| 4,361,656 A | 11/1982 | Mostafa | |
| 4,457,729 A | 7/1984 | Peerlkamp | |
| 4,492,663 A * | 1/1985 | Reinfeld | B29C 33/308 |
| | | | 364/45.4 |
| 4,546,899 A | 10/1985 | Williams | |
| 4,573,741 A | 3/1986 | Kirchner-Carl | |
| 4,621,002 A | 11/1986 | Kuhlmann et al. | |
| 4,651,494 A | 3/1987 | Van Wagoner | |
| 4,680,909 A | 7/1987 | Stewart | |
| 4,762,438 A | 8/1988 | Dewing | |
| 4,825,089 A | 4/1989 | Lindsay | |
| 4,840,973 A | 6/1989 | Kuwabara et al. | |
| 4,961,715 A | 10/1990 | Shanelec | |
| 5,018,329 A | 5/1991 | Hasan et al. | |
| 5,023,042 A | 6/1991 | Efferding | |
| 5,028,377 A | 7/1991 | Hendry | |
| 5,055,350 A | 10/1991 | Neefe | |
| 5,093,053 A | 3/1992 | Eckardt et al. | |
| 5,252,270 A | 10/1993 | Haardt et al. | |
| 5,275,860 A | 1/1994 | D'Luzansky et al. | |
| 5,306,266 A | 4/1994 | Freeland | |
| 5,345,814 A | 9/1994 | Cur et al. | |
| 5,366,674 A | 11/1994 | Hattori et al. | |
| 5,505,810 A | 4/1996 | Kirby et al. | |
| 5,532,034 A | 7/1996 | Kirby et al. | |
| 5,580,621 A | 12/1996 | Kuszaj et al. | |
| 5,624,517 A | 4/1997 | Giesen et al. | |
| 5,665,285 A * | 9/1997 | Hattori | B29C 44/18 |
| | | | 264/126 |
| 5,711,073 A | 1/1998 | Tippmann et al. | |
| 5,713,518 A | 2/1998 | Fox et al. | |
| 5,759,459 A | 6/1998 | Eckardt et al. | |
| 5,786,394 A | 7/1998 | Slaven | |
| 5,824,261 A | 10/1998 | Berdan | |
| 5,858,159 A | 1/1999 | Holbrook et al. | |
| 5,866,224 A | 2/1999 | Ang et al. | |
| 5,956,905 A | 9/1999 | Wiedrich | |
| 6,086,145 A | 7/2000 | Wandyez | |
| 6,179,215 B1 | 1/2001 | Shea | |
| 6,196,760 B1 | 3/2001 | Sinclair | |
| 6,230,981 B1 | 5/2001 | Hill et al. | |
| 6,241,926 B1 | 6/2001 | Cutler | |
| 6,286,879 B1 | 9/2001 | Haque et al. | |
| 6,375,892 B2 | 4/2002 | Thomas | |
| 6,605,343 B1 | 8/2003 | Motoi et al. | |
| 6,607,680 B1 * | 8/2003 | Moitzheim | B29C 44/146 |
| | | | 264/45.4 |
| 6,685,333 B1 | 2/2004 | Bieberdorf | |
| 6,692,183 B2 | 2/2004 | Godfrey | |
| 6,931,809 B1 | 8/2005 | Brown et al. | |
| 6,938,968 B2 | 9/2005 | Tanimoto et al. | |
| 6,955,576 B2 | 10/2005 | Yen | |
| 6,972,144 B2 | 12/2005 | Roth et al. | |
| 7,201,112 B2 | 4/2007 | Jolley | |
| 7,201,625 B2 | 4/2007 | Yen | |
| 7,219,479 B2 | 5/2007 | Durning et al. | |
| 7,358,280 B2 | 4/2008 | Berghmans et al. | |
| 7,377,828 B2 | 5/2008 | Cheung | |
| 7,401,998 B2 | 7/2008 | Wilson et al. | |
| 7,485,352 B2 | 2/2009 | Yuasa et al. | |
| 7,537,413 B1 | 5/2009 | Brugos | |
| 7,670,202 B2 | 3/2010 | Yeh | |
| 7,931,210 B1 | 4/2011 | Pike et al. | |
| 7,950,592 B2 | 5/2011 | Yuan | |
| 7,976,749 B2 | 7/2011 | Volkel et al. | |
| 8,181,288 B1 | 5/2012 | Davis, Jr. | |
| 8,318,061 B2 * | 11/2012 | Hattori | B29C 45/7306 |
| | | | 264/328.16 |
| 2001/0035658 A1 | 11/2001 | Anderson et al. | |
| 2002/0124531 A1 | 9/2002 | Mossbeck et al. | |
| 2003/0081999 A1 | 5/2003 | Godfrey | |
| 2003/0181536 A1 | 9/2003 | Roth | |
| 2003/0209828 A1 | 11/2003 | Nohara et al. | |
| 2003/0224675 A1 | 12/2003 | Yeh | |
| 2004/0172964 A1 | 9/2004 | Brachert et al. | |
| 2004/0176001 A1 | 9/2004 | Yeh | |

(56) References Cited

U.S. PATENT DOCUMENTS

| | | |
|---|---|---|
| 2004/0232254 A1 | 11/2004 | Kowalski |
| 2005/0001048 A1 | 1/2005 | Skoblenick et al. |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0003044 A1 | 1/2006 | Dinello et al. |
| 2006/0030467 A1 | 2/2006 | Mellott |
| 2006/0078382 A1 | 4/2006 | Wilson et al. |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2007/0180847 A1 | 8/2007 | Schabron et al. |
| 2008/0018161 A1 | 1/2008 | Evans |
| 2008/0048462 A1 | 2/2008 | Zabik |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0275148 A1* | 11/2008 | Tokiwa .................. B29C 44/14 521/51 |
| 2008/0305304 A1 | 12/2008 | Yeh |
| 2009/0011667 A1 | 1/2009 | Hayward et al. |
| 2009/0100780 A1 | 4/2009 | Mathis et al. |
| 2009/0133354 A1 | 5/2009 | Spear et al. |
| 2010/0028654 A1 | 2/2010 | Takase et al. |
| 2010/0116180 A1 | 5/2010 | Roth et al. |
| 2011/0115120 A1 | 5/2011 | Hattori et al. |
| 2011/0180959 A1 | 7/2011 | Donnelly et al. |
| 2012/0031912 A1 | 2/2012 | Wang |
| 2012/0102884 A1 | 5/2012 | Roberts, Jr. |
| 2012/0104110 A1 | 5/2012 | Roberts, Jr. |
| 2012/0240451 A1 | 9/2012 | Ricks |
| 2012/0328889 A1 | 12/2012 | Hayashi et al. |
| 2013/0140860 A1 | 6/2013 | Naughton et al. |
| 2013/0175725 A1 | 7/2013 | Tokiwa et al. |
| 2014/0075666 A1 | 3/2014 | Campbell et al. |
| 2015/0064379 A1 | 3/2015 | Roberts |

FOREIGN PATENT DOCUMENTS

| | | |
|---|---|---|
| EP | 0535147 | 9/1996 |
| EP | 1987934 | 11/2008 |
| JP | 58213028 | 12/1983 |
| JP | S59145125 | 8/1984 |
| JP | 59155443 | 9/1984 |
| JP | 59210954 | 11/1984 |
| JP | 60090744 | 5/1985 |
| JP | 06166112 | 6/1994 |
| JP | 07195536 | 8/1995 |
| JP | 2010046920 | 3/2010 |
| WO | 9119867 | 12/1991 |
| WO | 2008121754 | 10/2008 |
| WO | 2011103284 | 8/2011 |

OTHER PUBLICATIONS

Website, Manning, www.mmh.com Oct. 2008, Retrived on Jan. 4, 2011, "Modern Materials Handling, Choosing Plastic." 2 Pages.

Website, Specter, www.mmh.com Sep. 2009, "Modern Materials Handling, The Rise of the Plastic Pallet." 4 Pages.

Vehicle Certification Agency Oct. 25, 2007, pp. 1-6, Test Report No. ESH178571, "Test Report: Seat Strength.".

ECE Agreement Jul. 31, 2002, Regulation No. 17, "Concerning the adoption of uniform technical prescriptions for wheeled vehicles, equipment and parts which can be fitted and / or used on wheeled vehicles and the conditions for reciprocal recognition of approvals granted on the basis of these prescriptions."

National Highway Traffic Safety Admin., DOT. 49 C.F.R. § Part 581, Undated.

Extended European Search Report for European Application No. EP 13769879.1, Completed by the European Patent Office, Dated May 11, 2016, 20 Pages.

Partial Supplementary European Search Report for European Application No. 13769879.1, Completed by the European Patent Office, Dated Nov. 11, 2015, 9 Pages.

GB Examination Report for GB 1306511.3, Completed by the GB Patent Office, Dated Aug. 10, 2016, 5 Pages.

\* cited by examiner

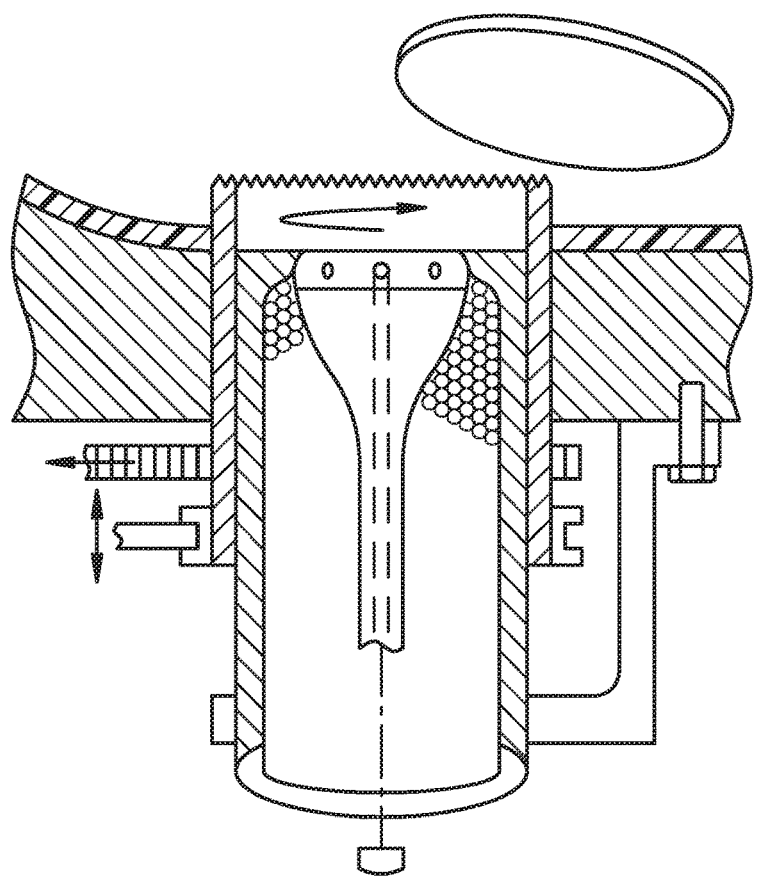
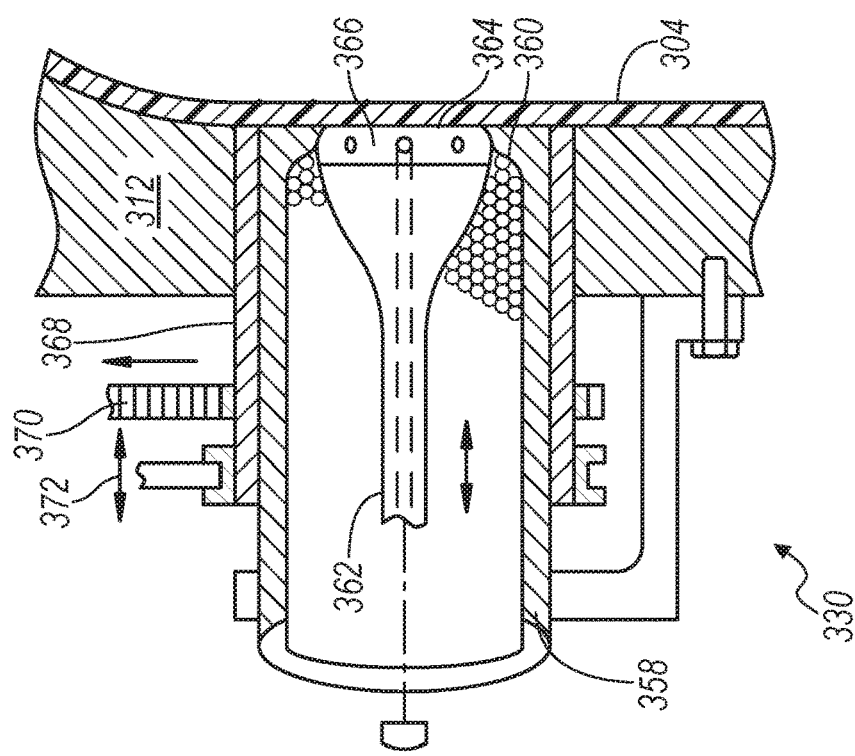

RECYCLABLE PLASTIC STRUCTURAL ARTICLES AND METHOD OF MANUFACTURE

CROSS-REFERENCE TO RELATED APPLICATIONS

This application is a divisional of U.S. application Ser. No. 13/840,827 filed Mar. 15, 2013, which is a continuation-in-part of PCT/US2011/058119 filed Oct. 27, 2011, which claims priority to U.S. application Ser. No. 12/913,132 filed Oct. 27, 2010 now U.S. Pat. No. 8,342,420 issued Jan. 1, 2013, the disclosures of which are incorporated in their entirety by reference herein.

TECHNICAL FIELD

The disclosed embodiments relate to recyclable plastic structural articles and methods of manufacture of same.

BACKGROUND

Substitution of plastic compositions for structural articles formed from non-plastic materials may meet objections regarding relatively low physical properties of the substitute plastic composition. Manufacturers often blend the plastic composition with other resins and additives to improve the physical properties. But, the blends of resins and additives may decrease the recyclability of the plastic composition.

In one example of a structural article suitable for material substitution, railroad ties support relatively great weights of railroad locomotives and their attached train cars with their contents. As the trains pass over railroad rails supported on railroad ties, the ties experience substantial vibration, in addition to the compressive force of the weight. When the ties are not in use, they are still subjected to harsh environment extremes of temperature, ultraviolet light, and moisture. The degradation of wooden railroad ties through this exposure to the environment requires that the ties must be replaced frequently in order to continue to perform their primary function of supporting the weight of the train. The wood used to make conventional railroad ties is increasingly becoming more expensive. Wooden railroad ties are heavy making the job of replacing them difficult.

SUMMARY

Disclosed embodiments relate to recyclable plastic structural articles and methods of manufacture of same. In at least one embodiment, a plastic structural article includes an elongated tubular shell having opposed end sections, a middle section therebetween and an interior cavity. The article also includes a foam core comprised of steam expandable polymer beads which when expanded substantially fill the interior cavity.

The article in another embodiment, includes a railroad tie having an elongated shell including opposed closed end sections and a middle section therebetween. The shell defines an elongate interior cavity. Substantially filling the cavity is a foam core comprising expanded polyolefin beads.

In yet another embodiment, a method of manufacturing a plastic structural article includes blow-molding a plastic preform in a mold cavity in the shape of an elongated member to form an elongated tubular plastic shell. The shell has opposed end sections, a middle section therebetween and a hollow interior cavity. The method also includes forming at least one fill port and a plurality of heating ports in the wall of the plastic shell. The shell interior cavity is filled with expandable polymer beads. The polymer beads are expanded by injecting a hot, at least partially vaporized, heating medium into the heating ports. The polymer beads expand so as to substantially fill the interior cavity of the shell. The plastic shell is constrained to limit expansion of the shell caused by the heated expanding polymer beads until the assembly is sufficiently cooled to limit substantial further expansion. The mold cavity is opened releasing the plastic structural article.

BRIEF DESCRIPTION OF THE DRAWINGS

FIGS. 16a-16d illustrate a bead filled gun in various states of operation;

DETAILED DESCRIPTION

Figure 1:
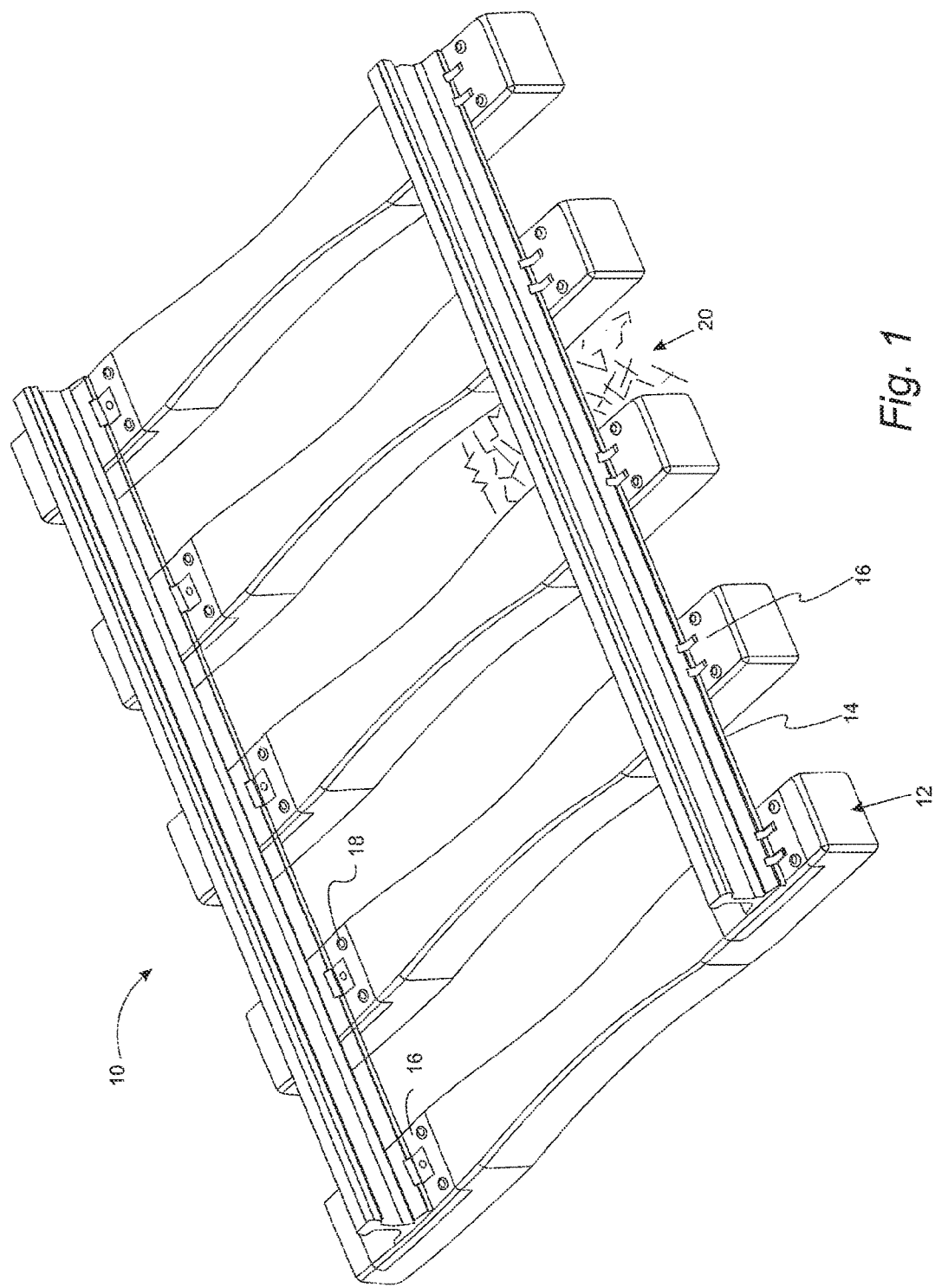
FIG. 1 schematically illustrates a fragmentary isometric view of a rail pattern according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "terpolymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

Regarding FIG. 1, a section of railroad track is shown having a rail pattern 10 comprising two lengths of a railroad rail 14 that supports a maximum length of a span of a railroad car or locomotive from truck to truck. In at least one embodiment, rail pattern 10 comprises 5 to 50 railroad ties 12. In another embodiment, rail pattern 10 comprises 20 to 35 railroad ties 12. In yet another embodiment, rail pattern 10 comprises 25 to 32 railroad ties 12.

In at least one embodiment, rail pattern 10 includes railroad ties 12 situated on a rail bed 20. Ties 12 support at least two rails 14 which are parallel and spaced apart. Rail 14 is connected to railroad tie 12 with a plate 16 connected to rail 14. Plate 16 is fastened to railroad tie 12 by one or more spikes 18.

Figure 2:
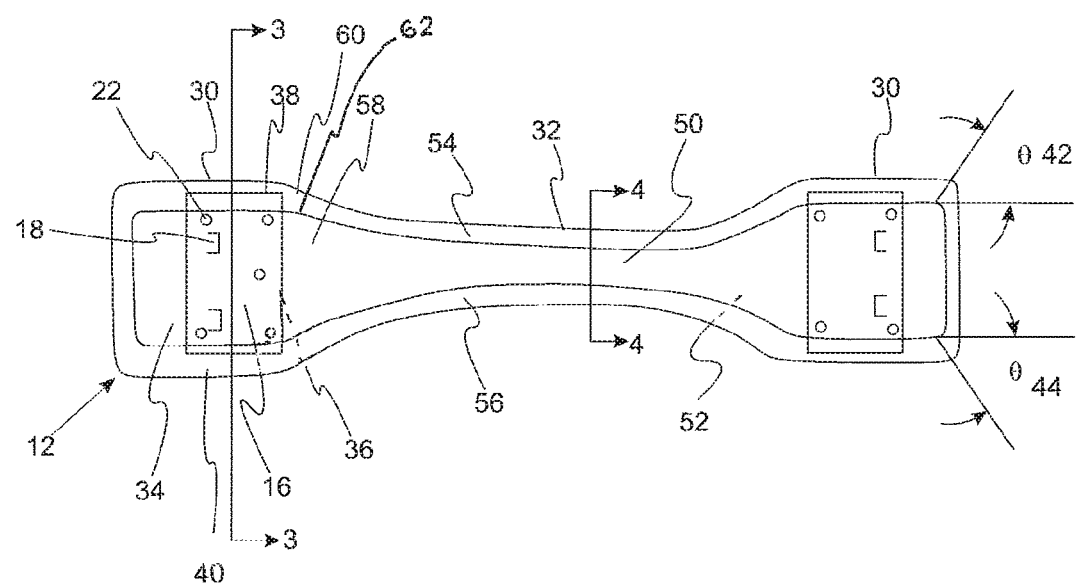
FIG. 2 schematically illustrates a railroad tie according to at least one embodiment.
Figure 3:
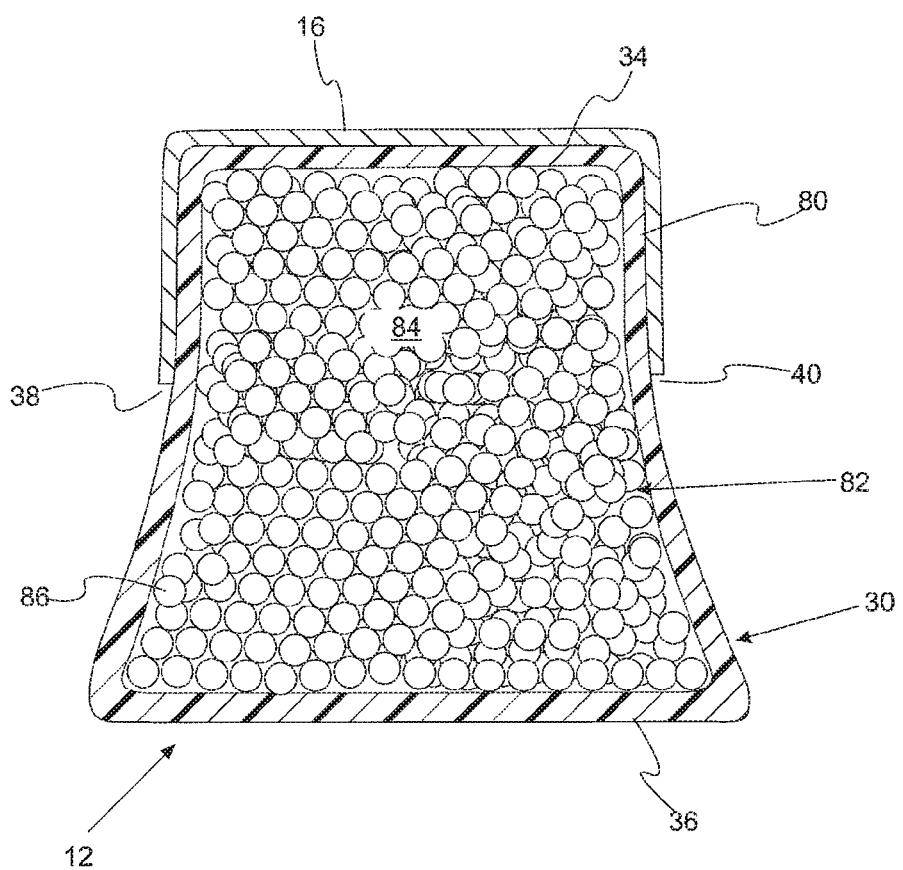
FIG. 3 schematically illustrates a cross-sectional view of a railroad tie along axis 3-3 in FIG. 2.

Turning now to FIG. 2, an embodiment of railroad tie 12 is schematically illustrated. Railroad tie 12 has two end sections 30 and a middle section 32. End section 30 includes a top surface 34 to which plate 16 is fastened. Opposed and parallel to top surface 34 is bottom surface 36 which is in contact with rail bed 20. Connecting top surface 34 and bottom surface 36 are two sides 38 and 40. An angle 42 between side 38 and top surface 34 may be perpendicular or range from 60° to 120°. An angle 44 between side 40 and surface 34 may also be perpendicular or, in another embodiment, range from 60° to 120°. Sides 38 and 40 may be linear, or curvilinear as illustrated in FIG. 3.

The height of the railroad tie 12 between top and bottom surfaces 34 and 36 may range from 4 inches to 16 inches in various embodiments. The width between sides 38 and 40 may range from 4 inches to 16 inches in different embodiments. The width between sides 38 and 40 may be effective to create a short column.

Figure 4:
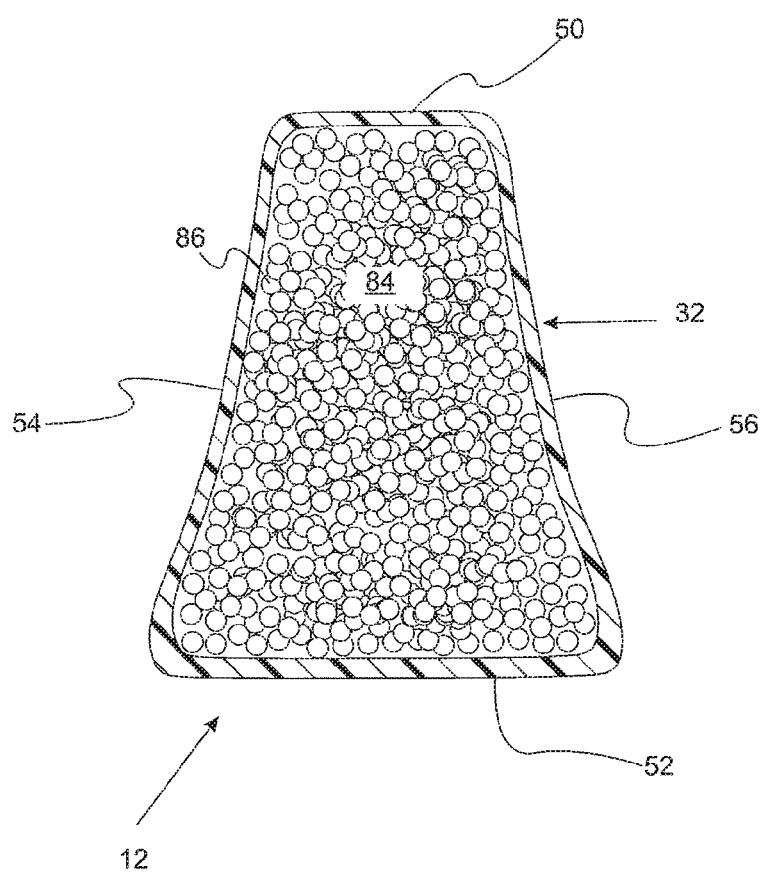
FIG. 4 schematically illustrates a cross-sectional view of a railroad tie along axis 4-4 in FIG. 2.

Middle section 32 includes a top surface 50 and a bottom surface 52 opposed and spaced apart from top surface 50. Connecting top surface 50 and bottom surface 52 are sides 54 and 56. Sides 54 and 56 may be linear, or curvilinear such as convex or concave, as illustrated in FIG. 4.

A transition 58 between the top surface 34 of end section 30 and top surface 50 of middle section 32 may be linear or curvilinear. A transition 60 between either sides 38 and 54 or sides 40 and 56 of the end section 30 and the middle section 50 may be linear or curvilinear. In at least one embodiment, the intersection of transitions 58 and 60 forms a Coons corner geometry 62.

Turning now to FIG. 3, a cross-sectional view of the end section 30 of railroad tie 12 along axis 3-3 of FIG. 2 is schematically illustrated. Wall 80, which includes outer periphery top and bottom surfaces 34 and 36, as well as sides 38 and 40, defines an interior cavity 82 into which a core 84 is formed. Wall 80 may be formed from a polymeric composition. The polymeric composition may include thermoplastic and/or thermoset polymers. In at least one embodiment, the polymeric composition is recyclable. Non-limiting examples of polymeric compositions suitable for wall 80 include polyolefins, such as polypropylene and polyethylene.

In certain embodiments, especially when the plastic standard articles are exported to cold environment, wall 80 includes a blow moldable thermoplastic polyolefin/polypropylene blend, a thermoplastic elastomer/polypropylene blend interpenetrating polyolefin blend, a thermoplastic having a glass transition temperature less than −80 EC/polyolefin blend, a hetergeneous polymer blend, and a thermoplastic having a glass transition temperature less than −20 EC/polyolefin blend, a thermoplastic vulcanizate/polyolefin blend. In certain embodiments, hetergeneous polymer blends having a crystalline thermoplastic phase and a high molecular weight or crosslinked elastomeric phase may be supplied by Exxon Mobile or Advanced Elastomer Systems.

In at least one embodiment, the ratio of thermoplastic polymer to polyolefin ranges from 5 wt. % to 70 wt. % of the blend. In another embodiment, the ratio of thermoplastic polymer to polyolefin ranges from 10 wt. % to 40 wt. %.

The thickness of wall 80 may range from 0.03 inches to 0.5 inches in at least one embodiment. In another embodiment, the thickness of wall 80 may range from 0.125 inches to 0.25 inches. In the illustrated embodiment, the wall is made of an elongated tube of polypropylene material having a wall thickness ranging from 0.14 inches to 0.17 inches before shrinkage which is blow-molded into the shape of the tie 12 having a finished wall thickness ranging from 0.13 to 0.16 inches.

Core 84 may include steam-expandable polymer particles 86, such as expanded polyolefin polymer beads. In at least one embodiment, the expanded polyolefin polymer beads includes expanded polypropylene polymer beads (EPP). In yet another embodiment, core 84 includes expanded high molecular weight polypropylene polymer beads. In yet another embodiment, homopolymer beads are included in the expanded polyolefin beads in order to increase the stiffness of core 84. As a non-limiting example, when the homopolymer polyolefin is a homopolymer polypropylene, the stiffness increases such that a 100,000 lb load yields a 5.8% strain and a compression of only 0.007 inches. In another example, the strain ranges from 2% strain to 10% strain. In at least one embodiment, EPP may be formed in situ by injection of steam into polypropylene beads to form steam-injected expanded polypropylene. It is understood that a portion of core 84 may comprise polyolefin beads in an unexpanded configuration or a partially expanded configuration.

Steam-injected expanded polypropylene may have a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam-injected EPP may have a density ranging from 3 lbs/ft$^3$ to 5 lbs/ft$^3$.

A load applied by a train may be more broadly distributed throughout core 84 by wrapping plate 16 around the sides 38 and 40 as shown in FIG. 3. Plate 16 forms an inverted "U" shape in order to support sides 38 and 40 and limits outward defection under load.

In FIG. 4, middle section 34 of railroad tie 12, in certain embodiments, includes a cavity 84 which is filled with expanded polyolefin. The expanded polyolefin particles 86 filling cavity may have a density that is less than, equal to, or greater than the density of expanded polyolefin in cavity 84 of end section 30. In another embodiment, end section 30 has a density of EPP that is at least 1 lb/ft$^3$ less than the density of EPP in middle section 34. While FIGS. 3 and 4 describe having 3 density zones, it is understood that railroad tie 12 may have one or more density zones without exceeding the scope or spirit of the embodiment. Further, it is understood that, in certain embodiments, the density zones may comprise a relatively uniform gradient of density throughout portions of the railroad tie 12 without relatively clear demarcation of one or more density zones. In the illustrated embodiment, the density of the EPP beads in the end section is 5 lbs/ft$^3$ while the density of the EPP beads in the middle section is 3 lbs/ft$^3$.

Figure 5:
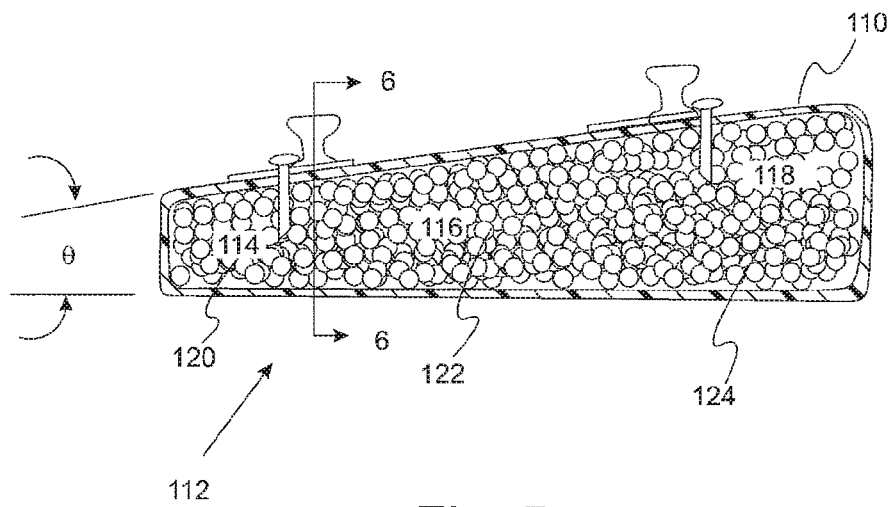
FIG. 5 schematically illustrates a cross-sectional view of a second railroad tie embodiment.

Turning now to FIG. 5, in at least one embodiment an angled railroad tie 112 suitable for use in a curved railroad pattern is schematically illustrated in cross-sectional view. Angled railroad tie 112 is formed from an angular wall section 110 which defines three sub-cavities 114, 116 and 118. Into cavity 114, a first expanded polyolefin 120 is formed. Into sub-cavity 116, a second expanded polyolefin 122 having a density less than expanded polyolefin 120 is formed. Into cavity 118, a third expanded polyolefin 124 having a third density is formed. In other embodiments, the densities of expanded polyolefins 120, 122 and 124 may be equal or different.

The angle of angled railroad tie 112 is given by angle σ. Angle σ is determined by a camber needed for safe passage of a train in a curve in the rail track pattern 10. It is desirable to have angled railroad tie 112 because rail bed 20 may be uniformly prepared as a flat and level bed surface. In at least one embodiment, the angle σ may range from 0.1° to 30°. In another embodiment, the angle σ may range from 0.5° to 10°. In yet another embodiment, the angled railroad tie comprises a wedge shape.

Figure 6:
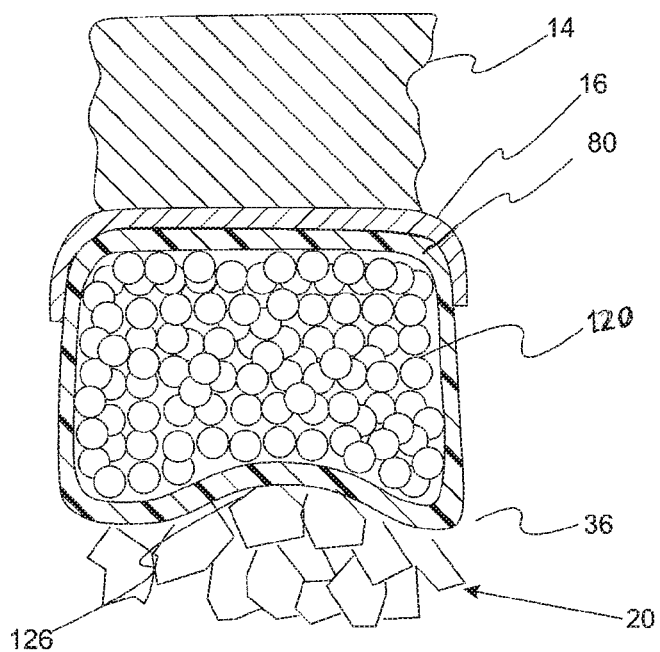
FIG. 6 schematically illustrates a fragmentary cross-sectional view of a railroad tie along axis 6-6 in FIG. 5.

Turning now to FIG. 6, a transverse, cross-sectional view along axis 6-6 of FIG. 5 is illustrated. Bottom surface 36, in at least one embodiment, includes a retention structure 126 which interacts with rail bed 20 to form an interference that reduces the tendency of the railroad tie 112 to move when a directional force is applied to railroad tie 112 by the passage of a train.

Figure 7:
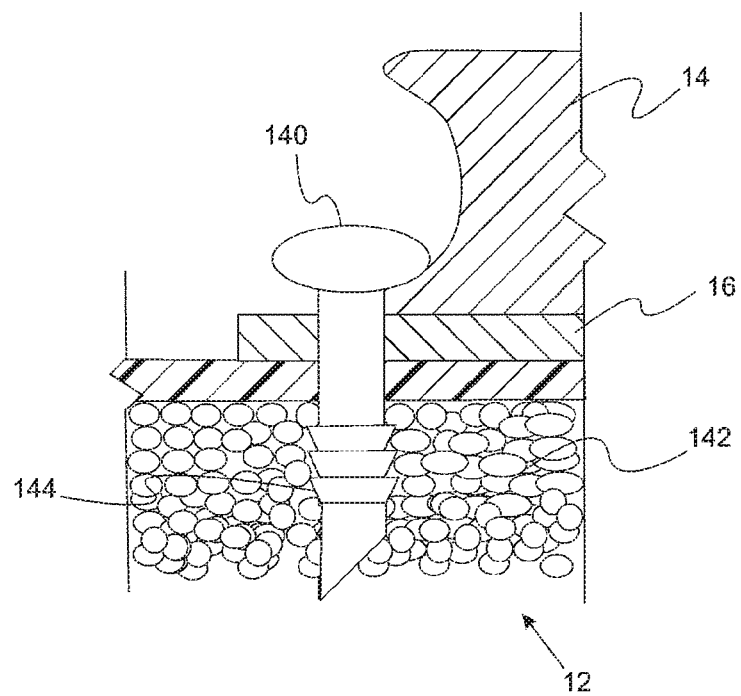
FIG. 7 schematically illustrates a fragmentary longitudinal, cross-sectional view of a railroad tie and rail system illustrating spike placement.

FIG. 7 illustrates a ringed shank fastener 140, such as a spike for use with railroad tie 12. The expanded polyolefin 142 moves aside as the ringed shank spike 140 is driven into railroad tie 12 in at least one embodiment. The expanded polyolefin 142 then rebounds to wrap around the ring shanks 144 of the spike 140 to secure the rail 14 and plate 16 to railroad tie 12.

In at least one embodiment ring shank 144 extends 0.100 inches to 0.300 inches from the root of spike 140. Ring shank 144 is configured as an inverted frustro conical section. Spike 140 may include a plurality of such frustro conical sections sequentially configured along the longitudinal axis of spike 140. It is understood that other shapes providing an undercut may be suitable for use with spike 140.

Figure 8:
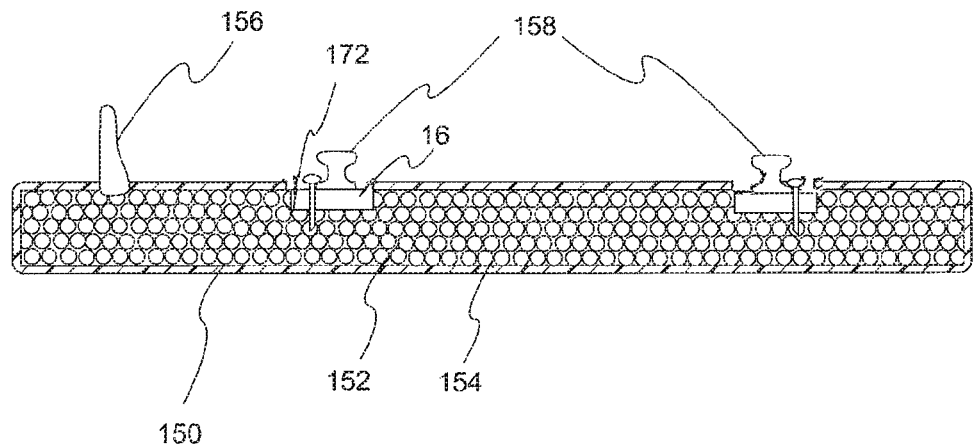
FIG. 8 schematically illustrates a cross-sectional view of a third rail configuration with a railroad tie.

FIG. 8 illustrates a third rail configuration for use with a railroad tie 150 according to at least one embodiment. Railroad tie 150 includes an expandable polyolefin 152 in a cavity defined by wall 154. A third rail device 156 is mounted on railroad tie 150. Third rail device 156 is electrified to supply power to an electrical train. Electrical power is then transferred to rails 158 back to the power station.

In addition, FIG. 8 illustrates having plate 16 inset into a plate retention structure 172 embossed into tie 150. It is understood that retention structure 126 and plate retention structure 172 may be present in the same railroad tie.

Figure 9:
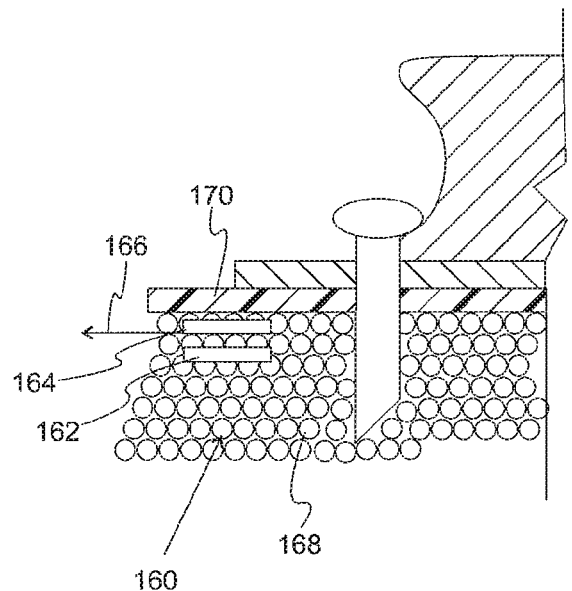
FIG. 9 schematically illustrates a fragmentary cross-sectional view of a railroad tie with load sensors.

FIG. 9 illustrates a fragmentary cross-section of a railroad tie 160 in which sensors are embedded according to at least one embodiment. One or more sensors, such as a RFID chip 162 with a piezoelectric strain gauge 164, may be embedded in an expanded polyolefin 168 in a cavity defined by wall 170. An optional conduit 166 may permit electrical connection of sensor 164 to an external signaling device. Sensors 162 and/or 164 may be introduced into the expanded polyolefin 168 prior to injection of the steam to expand the polyolefin beads. In another embodiment, the sensors may be place in the railroad tie 160 after demolding of the railroad tie by mechanical insertion means known in the art.

A typical railroad tie 12, in at least one embodiment, has a weight ranging from 10 lbs. to 200 lbs. for a 9 inch by 7 inch by 102 inch railroad tie. In another embodiment, railroad tie 12 has a weight ranging from 20 lbs. to 100 lbs. In yet another embodiment, railroad tie 12 has a weight ranging from 30 lbs. to 75 lbs. so that the tie can be carried by a single worker.

When railroad pattern 10 uses railroad tie 12, the expanded polyolefin core functions as an energy absorber. In at least one embodiment, railroad tie 12, when using expanded polypropylene as the core, experiences a deflection before permanent set in excess of 25%.

The force needed to deflect the railroad tie may be characterized by a spring rate which is a function of a cross-sectional area bending moment of the railroad tie 12, a length of the railroad tie 12 and an elastic modulus of the expanded polyolefin. Having a higher spring rate than wood, the expanded polyolefin in the railroad tie 12 may have a greater yield stress than wood. Having greater yield stress may result in the expanded polyolefin railroad tie having greater energy absorption than the wood railroad ties.

Increased energy absorption by the expanded polyolefin-based railroad ties may result in a relatively quiet railroad system when the train passes over the expanded polyolefin-based railroad ties.

The spring rate of the railroad tie may be increased or decreased by increasing or decreasing the density of the expanded polyolefin in the railroad tie core by use of methods disclosed in certain embodiments herein.

Polyolefin beads and methods of manufacture of unexpanded polyolefin beads suitable for making the illustrated embodiment are described in Japanese patents JP60090744, JP59210954, JP59155443, JP58213028, and U.S. Pat. No. 4,840,973, all of which are incorporated herein by reference. Non-limiting examples of expanded polyolefins are ARPLANK7 and ARPRO7 available from JSP, Inc. (Madison Heights, MI). Alternatively expanded polystyrene of polyethylene bead can be used but polypropylene is preferred for the railroad tie application.

The expanded polypropylene, such as the JSP ARPRO™ EPP, which has no external shell, exhibits physical properties such as in Table 1.

TABLE 1

| Property | Test Method | Units | Value | | | | | |
|---|---|---|---|---|---|---|---|---|
| Density | ASTM D-3575 | lbs/ft$^3$ | 1.0 | 2.8 | 3.7 | 4.2 | 4.6 | 5.0 |
| Compressive Strength | ASTM D-3575 | lbf/in$^2$ | | | | | | |
| @ 10% deflection | | | 8.4 | 32 | 44 | 53 | 61 | 68 |
| @ 25% deflection | | | 11 | 42 | 57 | 65 | 76 | 84 |
| @ 50% deflection | | | 19 | 54 | 73 | 84 | 97 | 112 |
| @ 75% deflection | | | 41 | 111 | 155 | 183 | 220 | 251 |
| Compressive Set | ASTM D-3575 | % | | | | | | |
| @ 25% deflection | | | 8 | 7 | 7 | 7 | 7 | 7 |
| @ 50% deflection | | | 16 | 12 | 12 | 12 | 12 | 12 |
| Compressive Creep @ 1000 hr | ASTM D-3575 | % | <0.5 | 1 | 1.5 | 2.5 | 3.0 | 3.5 |
| Service Temperature | ASTM D-3575 | B C | 100 | 100 | 100 | 100 | 100 | 100 |

Figure 10:
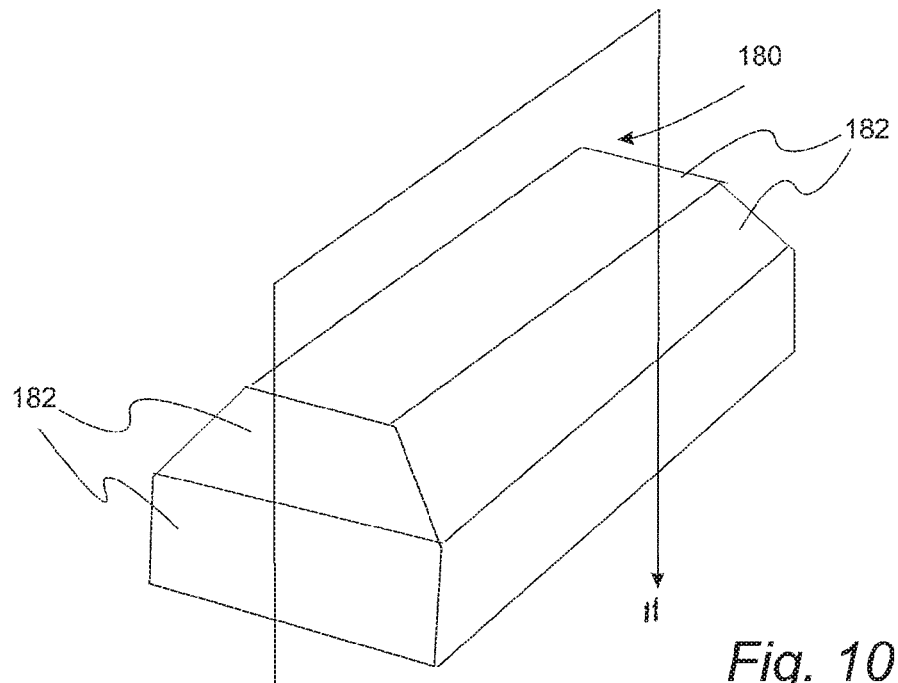
FIG. 10 schematically illustrates a bumper according to at least one embodiment.
Figure 11:
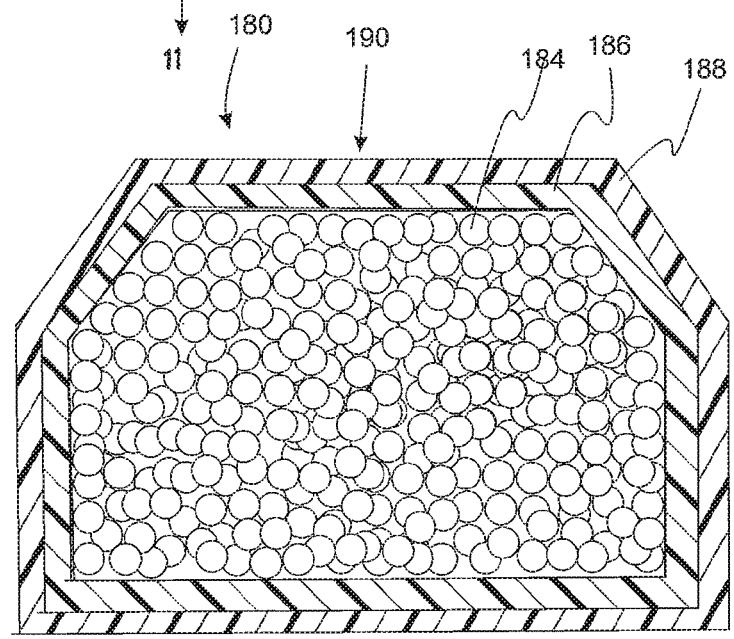
FIG. 11 schematically illustrates a cross-sectional view along axis 11-11 of FIG. 10.

Turning now to FIGS. 10 and 11, an embodiment of a bumper 180, such as the bumper suitable for a large truck chock block, a parking lot bumper, a dock bumper, a golf cart bumper, a roof for a low-speed vehicle, or ship fenders is schematically illustrated in isometric view in FIG. 10. Bumper 180 has an elongated tubular shape with one or more facets 182. The roof for the low-speed vehicle may range in thickness from 0.25 inches to 2 inches, preferable 0.75 inches to 1.25 inches.

In FIG. 11, a longitudinal cross-sectional view along axis 11-11 of FIG. 10 is schematically illustrated. The core 184 has a substantially uniform density of steam-expanded polypropylene beads throughout the entire profile of the elongated bumper 180. The shell 190, in at least one embodiment, is comprised of two layers: an inner layer 186 and an outer layer 188. The two layers 186 and 188, are formed concurrently when a blow mold parison is formed with two layers by coextrusions or methods known in the art. Inner layer 186 may have a first set of properties, such as recycled plastic composition, and outer layer 188 may have a second set of properties, such as including an ultraviolet light resistance package or a pigment. It is understood that outer layer 188 may have a different composition from inner layer 186. As a non-limiting example, outer layer 188 may include a co-polymer or 0-5 wt % of linear low density polyethylene (LLDPE) in order to increase flexibility of outer layer 188 resulting in reduced stress cracking. It is further understood that while two layers are illustrated here, a plurality of layers is contemplated. In another embodiment, the number of layers may range from one to 11. It is preferred that inner layer 186, outer layer 188, and core 184, have similar, if not identical compositions, to improve the recyclability of bumper 180.

Figure 12:
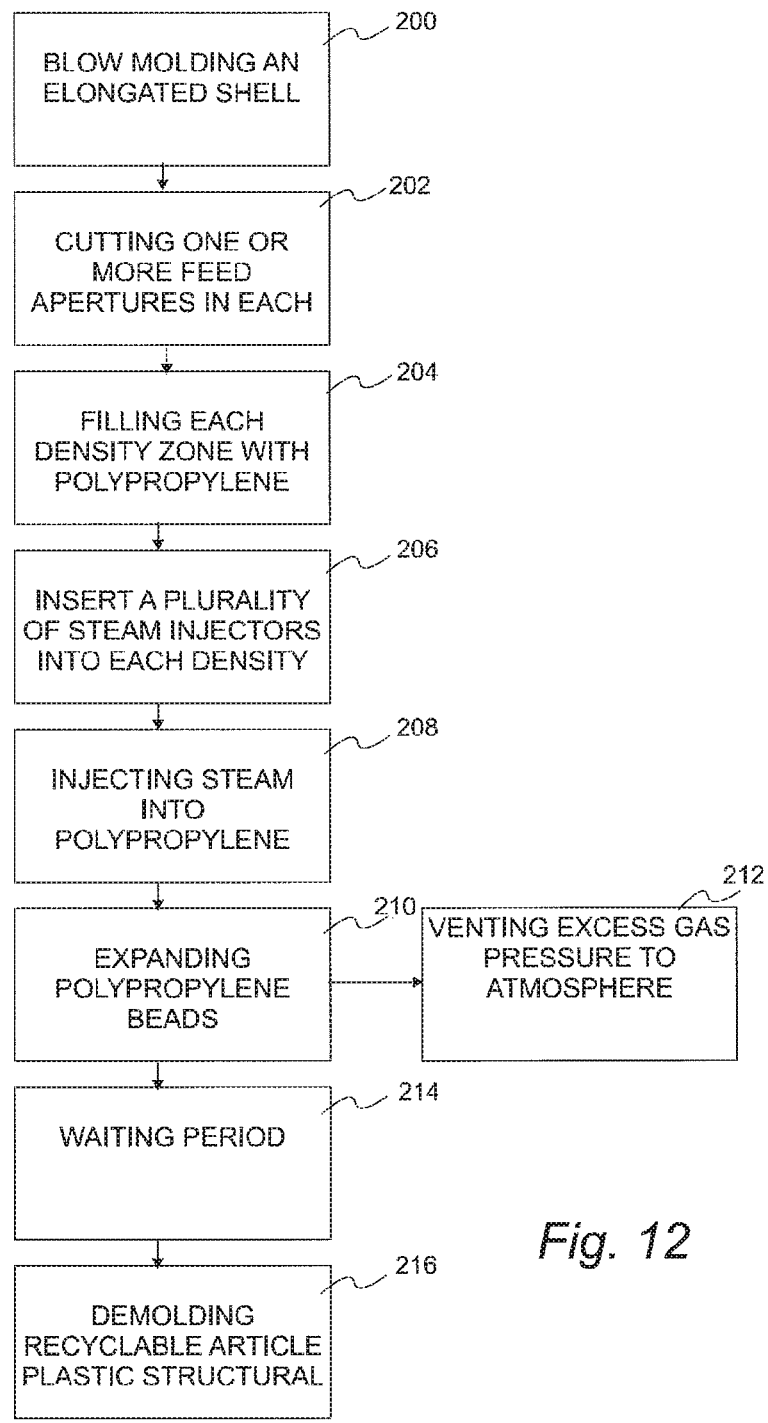
FIG. 12 illustrates a process flow diagram of a method of manufacture of a railroad tie according to at least one embodiment.

FIG. 12 diagrammatically illustrates a method for manufacturing the recyclable plastic structural article having multiple core density zones, in at least one embodiment, which includes blow-molding a hollow elongated shell in step 200. Feed apertures, such as an inlet, and heating ports are cut or pierced during step 202 into the blow-molded elongated shell of step 200. Polyolefin pellets are fed into the cavity of the elongated shell of step 200 during step 204. The density of polyolefin pellets in the lower first end of the elongated shell, are feed in first followed by the middle section, and/or the second end is controlled in step 204 during filling of the shell in one or more density zones. Steam injection needles can be inserted during step 206 into each density zone through heating ports or alternately the needles can be inserted at sit 204 before filming. In step 208 steam is injected at sufficient pressure effective to cause the polypropylene pellets to expand in step 210. Excess pressure is vented to the atmosphere in step 212. The molded railroad tie is allowed to cool in step 214. The mold is opened in step 216 to release the blow-molded recyclable plastic structural article.

Blow-molding step 200 preferably includes extruding a tubular parison. The mold is closed on the parison and about 90 to 100 lbf/in$^2$ pressure gas is applied to the parison interior cavity. The gas injected into the parison causes the plastic to conform to the shape of the walls of the mold. One or more gas injection needles are introduced to the parison prior to the cooling the plastic on the mold walls. Spacing between steam injection needles may vary with the density of unexpanded beads because the steam migration is limited. In at least one embodiment, the spacing between adjacent steam injection needles ranges from 2 inches to 6 inches.

In at least one embodiment, at approximately one half of the length of the cooling period, typically referred to as a blow cycle, feed apertures, such as fill ports, are cut. The cutting tools are withdrawn from the mold and a staged fill sequence for polyolefin pellets begins in step 204. The filling is preferably conducted from the bottom up. Upon completion of the staged fill sequence, the feed apertures are optionally closed with spin-welded plugs. The steam injection needles are injected to introduce steam for an injection time period ranging from 0.5 to 3 seconds, an injection time period sufficient to expand the bead. In at least one embodiment, steam is introduced as super heated steam. In another embodiment, steam is introduced at a pressure less than the clamp pressure on the mold sections. In yet another embodiment, steam is introduced in a range of 15 lbf/in$^2$ to 120 lbf/in$^2$. In at least one embodiment, the steam is introduced at 280 E Fahrenheit and 60 lbf/in$^2$ pressure. After a cooling time period, when post-mold expansion effectively ceases, the mold is opened to release the blow-molded railroad tie. In at least one embodiment, the time to cool the railroad tie so that post mold expansion does not substantially occur ranges from about 1 minute to 8 minutes. Optionally, the mold may be vented to the atmosphere to release excess gas pressure or the mold may be burped, i.e., opened briefly and then re-closed.

Figure 13:
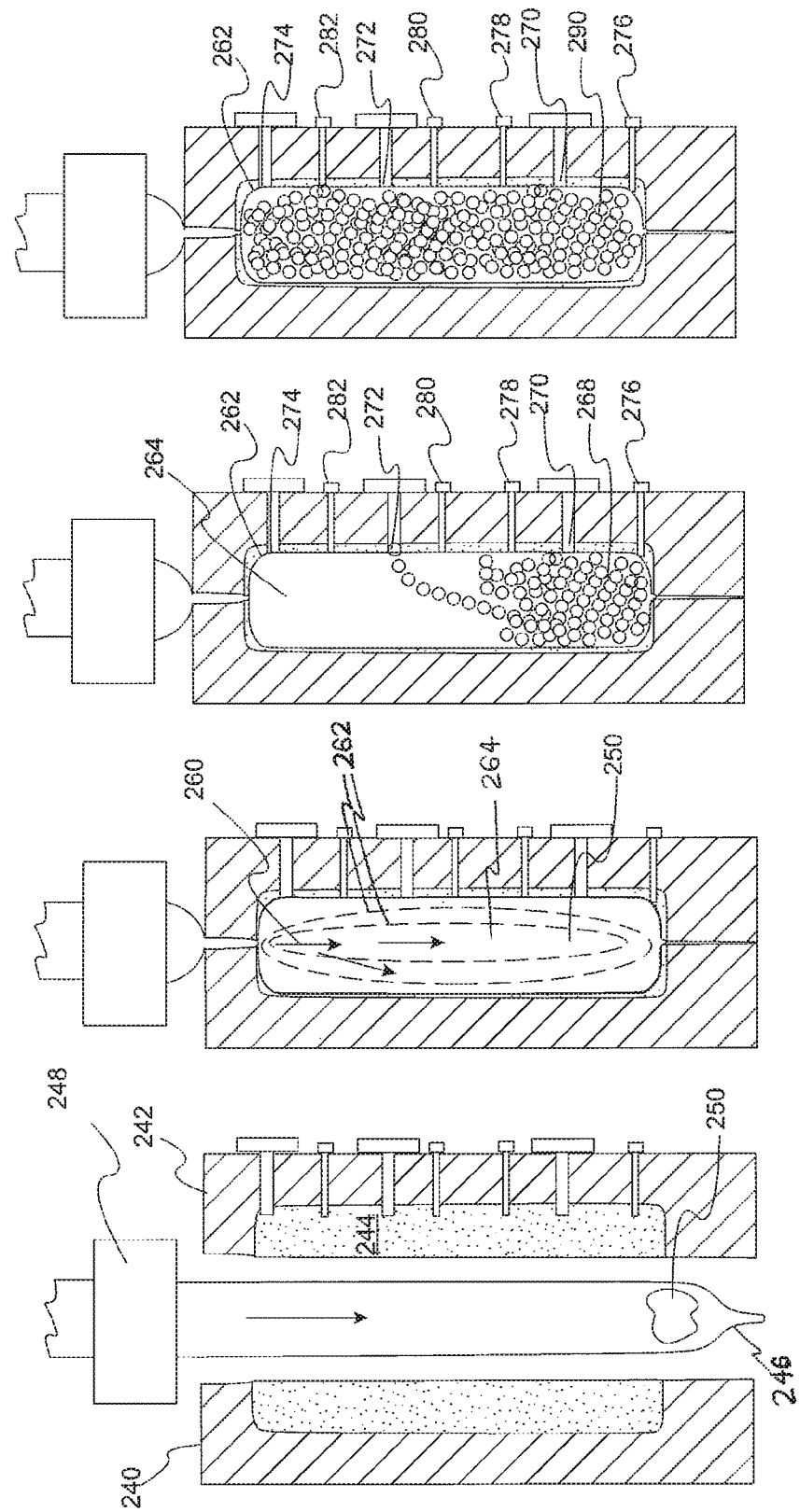
FIGS. 13a-13d schematically illustrate a process of manufacture of a railroad tie according to at least one embodiment.

Embodiments of steps 200, 202, 204, 206, and 208 are illustrated in FIGS. 13a B 13d.

In FIG. 13a, blow mold sections 240 and 242 define a blow mold cavity 244 into which a molten polyolefin parison 246 is extruded from an extruder 248. Parison 246 defines an internal parison cavity 250.

In FIG. 13b, blow mold sections 240 and 242 close upon parison 246. Gas 260 is injected into parison cavity 250 inflating the hot parison 246 while still soft and deformable to conform to the walls of the blow mold cavity 244 defining a shell 262 having a cavity 264 which may be larger than the original parison cavity 250.

In FIG. 13c, steps 202 and 204 of FIG. 10 are illustrated as feed apertures 270, 272, and 274 are cut through shell 262. Staged filling begins as unexpanded EPP beads 268 are introduced to cavity 264 through an EPP introduction device fitted to blow mold section 242. At a first stage, EPP beads 268 are introduced through feed aperture 270. When the cavity 264 is substantially filled to the height of feed aperture 270, a second stage introduces unexpanded EPP beads 268 through aperture 272 until that portion of cavity 264 is substantially filled. A third stage introduces unexpanded EPP beads 268 through aperture 274 until the cavity 264 is filled.

EPP introduction device (not shown) is withdrawn from apertures 270, 272, and 274. The apertures 270, 272, and 274 are plugged. Steam injection needles 276, 278, 280, 282 are inserted through blow mold section 242 and shell 262 into the filled cavity 264.

In FIG. 13d, steam is injected through steam injection needles 276, 278, 280, 282 into unexpanded beads 268 causing the beads to expand forming a core 290 in the area that was previously cavity 264, and bonded to the shell 262.

Figure 14:
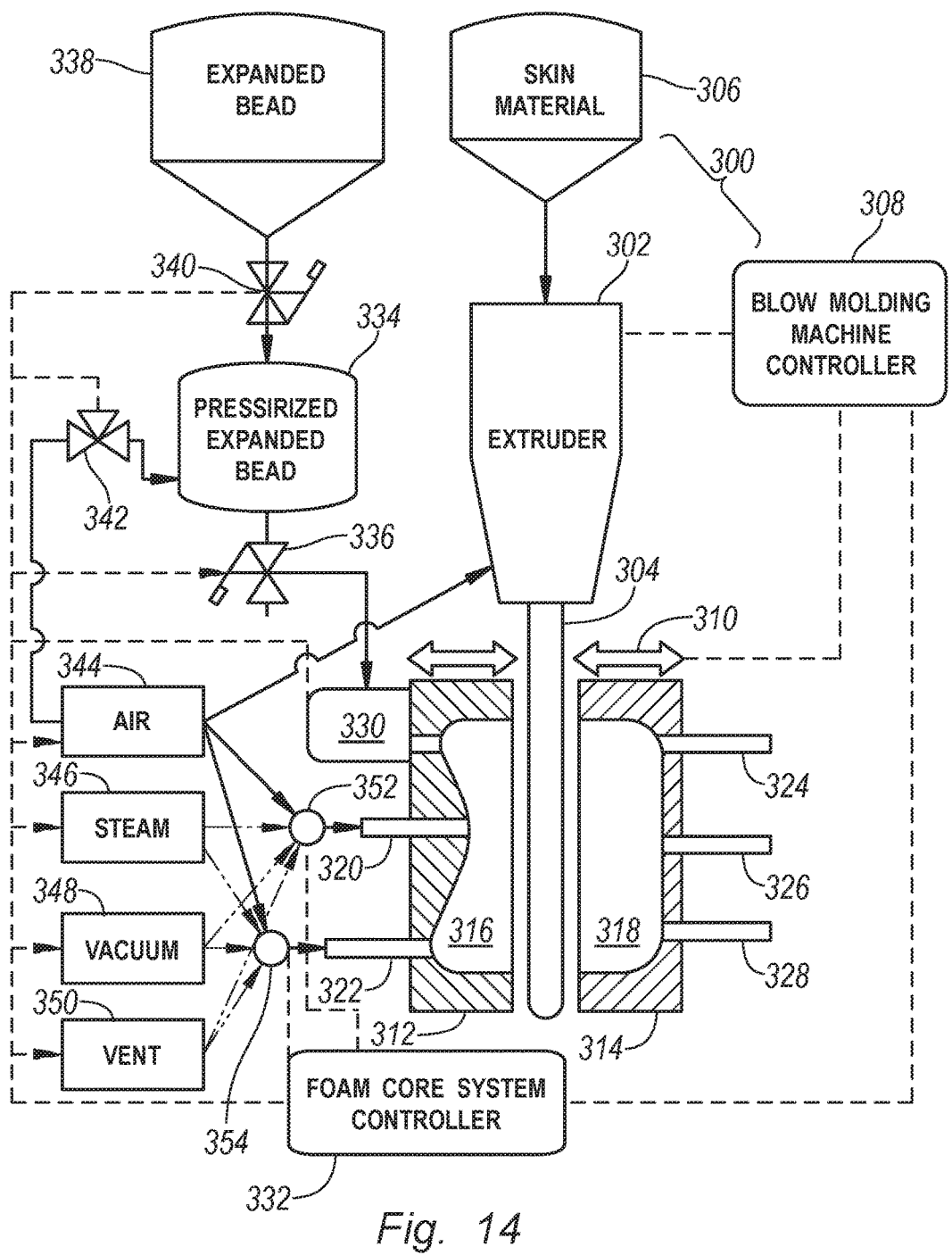
FIG. 14 is schematic illustration of an extrusion blow molding machine equipped with a foam core system.

FIG. 14 illustrates an extrusion blow molding machine 300 having a vertical extruder 302 for forming an elongate hollow plastic parison 304 out of plastic skin material supplied by hopper 306. A bold molding machine controller 308 controls the operation of extruder 302 and a mold actuator 310 capable of moving two mold halves 312 and 314 positioned on opposing lateral sides of the extruded parison 304 and between an open position illustrated and a closed position to entrap the parison within an internal cavity formed by internal mold cavity halves 316 and 318. Mold halves 312 and 314 are specifically adapted for forming a foam core article using the described methods. The mold halves are provided with a series of steam injector pins 320-328. Although only five steam pins are illustrated for simplicity purposes, the steam pins will be provided in an array having a sufficient number to thoroughly steam the product to be formed.

At least one of the mold halves will be provided with a bead fill gun 330 having a bead fill port which communicates with mold interior cavity portion 316. For simplicity purposes a single fill gun is illustrated, however, multiple filled guns at various locations can be provided as illustrated previously with respect to FIGS. 13a-13d. Preferably, at least one fill gun is located generally proximate the upper region of the mold cavity as illustrated in FIG. 14. Fill gun operation is controlled by a foam core system controller 332. Preferably, foam core system controller 332 is a separate controller which communicates with the blow molding machine controller 308. In that way, the foam core system can be added to existing blow molding extruding systems. Alternatively, the foam core system controller can be incorporated into the blow molding machine controller for new machines or in reconstructed blow molding extrusion machines.

The bead fill gun 330 is supplied with expanded bead under pressure from tank 334 which is coupled to the fill gun 330 by an interconnecting supply line containing and valve 336 controlled by foam core controller 332. The expanded bead is supplied to pressurized tank 334 from an expanded bead hopper 338 by a supply line containing a valve 340, again regulated by the foam core system controller 332. The pressure of the expanded bead in tank 334 is maintained by a three-way pressure regulator valve 342 coupling the pressurized tank 334 to a source of pressurized air 344. The operation of the three way pressure regulator valve 342 is controlled by the foam core controller enabling the controller to pressurize the tank to the desired pressure, preferably, 80 to 120 pounds per square inch gauge pressure (PSIG) and to alternatively vent the tank 334 to atmosphere to facilitate the introduction of more bead into the tank.

The steam pins 320-328 can be alternatively connected to pressurized air source 344, steam source 346, a vacuum source 348 and a vent 350. To facilitate these alternative connections and to enable a number of steam pins to be associated together in zones, a steam pin manifolds 352 and 354 are provided. In the illustrate schematic, only two manifolds are shown for simplicity, however, preferably, up to ten and more preferably about 6 manifolds can be operated by the foam core system controller. Each of the manifolds are connected to a series of steam pins and each manifold has an input/output connection to each of the air source, steam source, vacuum and vent 344, 346 and 348 and 350. Each of the input/output connections is controlled by a flow valve operated by the foam core system controller.

Figure 15C:
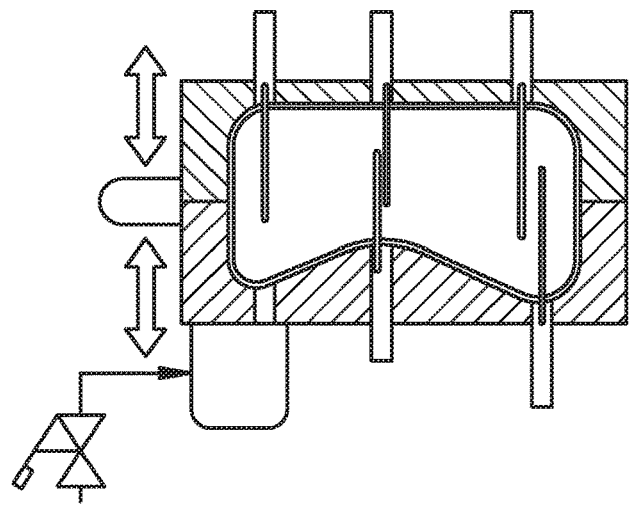
FIGS. 15a-15i schematically illustrate a more detailed process of the manufacture of a foam filled blow molded article.
Figure 15B:
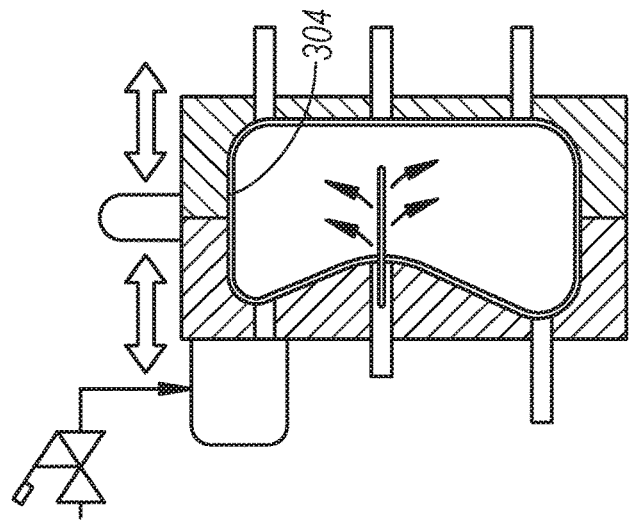
Figure 15A:
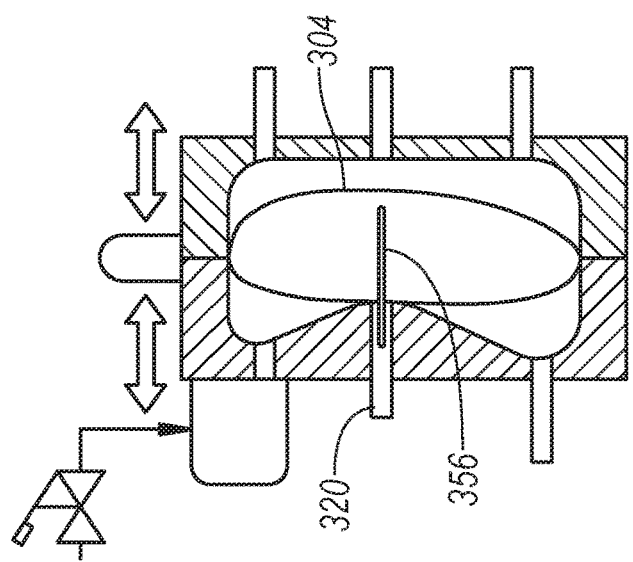
Figure 15F:
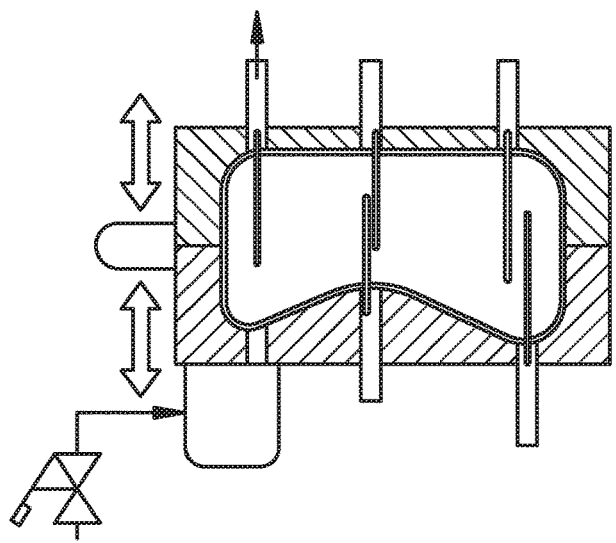

In operation, with the mold shown in the open position, as illustrated in FIG. 14, the extruder forms a tubular hollow plastic parison 304 of the thermoplastic skin material. Once the parison has reached the desired length relative to the cavity, the blow molding machine controller issues a closed mold signal causing the mold drive 310 to close the mold halves together. Upon issuance of the closed mold signal, the foam core system controller begins operation and temporarily takes over control of the blow molding machine. Immediately prior to or contemporaneously with the closing of the mold, the extruder will provide pressurized air into the internal cavity defined by the parison in what is known as a puffing operation so that when the mold is closed as illustrated in FIG. 15a, a portion of the partially inflated parison wall will contact a region of the mold cavity as illustrated. One or more steam pins in this first contacted region of the mold will be actuated driving a steam pin needle 356 into the hollow interior cavity of the blow molded parison 304. Once the first actuated needle or needles 356 extend into the parison, the foam core controller, opens the air valve supplying air to manifold 354 which in turn supplies air to needle 356 to blow the plastic parison 304 into a shell fully conforming it to the interior surfaces of the cavity halves 316 and 318 of mold halves 312 and 314. Once fully inflated, as shown in FIG. 15b, the controller will open air valves to the other manifolds 354 so that all the needles from all of the steam pins projecting provide preesurized gas such as air into the interior cavity of the parison 304 to fully conform to the interior shape of the mold cavity. As will be described further in detail, subsequently, foam core system controller will cause all of the steam pins to be vented initially allowing the internal pressure within the shell to drop from the blow molding pressure of 80 to 120 PSIG, preferably 90 PSIG. Once the pressure drops down to about 40 PSIG the fill gun cutter punches or cuts a hole into the hollow shell. The cutter then retracts as illustrated in FIG. 15D, and the filling process begins. When the pressure nears the tank pressure, all of the steam pins will be closed accept the most remote steam pins from the fill gun which were main vented whereupon the control valve 336 will open and the fill gun mandrel will open along via flow from the pressurized tank 334 into the shell cavity in a controlled manner. The venting of the manifold associated with the remote steam pins will be controlled to maintain a desired part cavity pressure. When the pressure drops below that of the pressurized bead tanks 334, which is about 30 PSIG+ or −2 PSIG bead flows into the shell cavity. The pressure of the vented manifold is maintained approximately 5 PSIG below the fill tank pressure providing adequate pressure differential for the quick and orderly filling of the cavity with bead without forming voids.

Figure 15E:
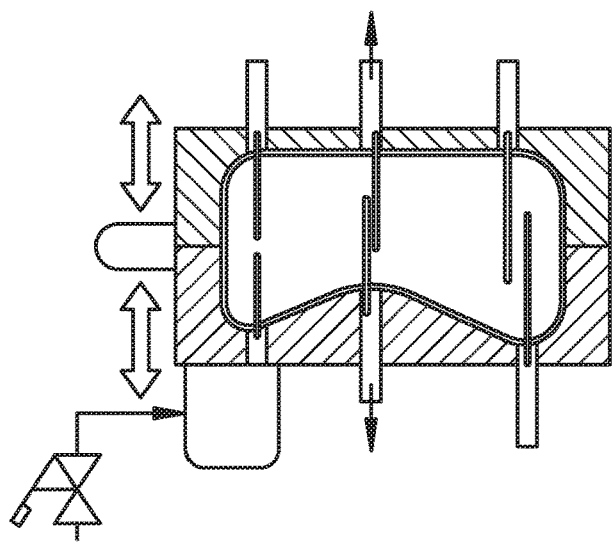
Figure 15D:
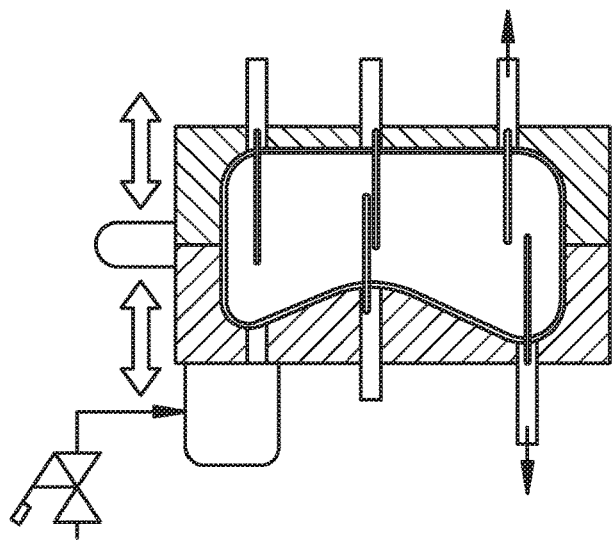
Figure 15I:
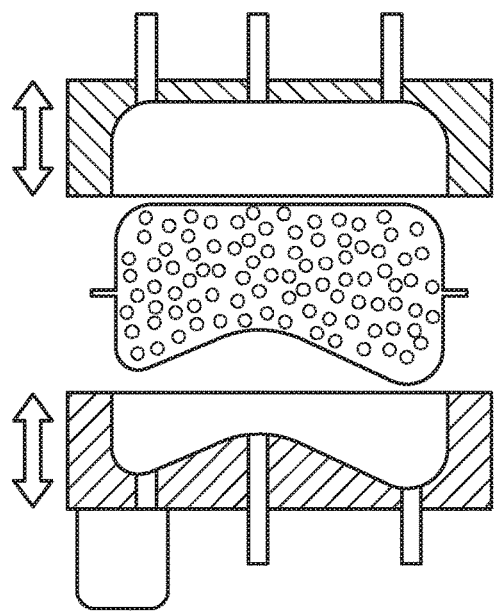
Figure 15H:
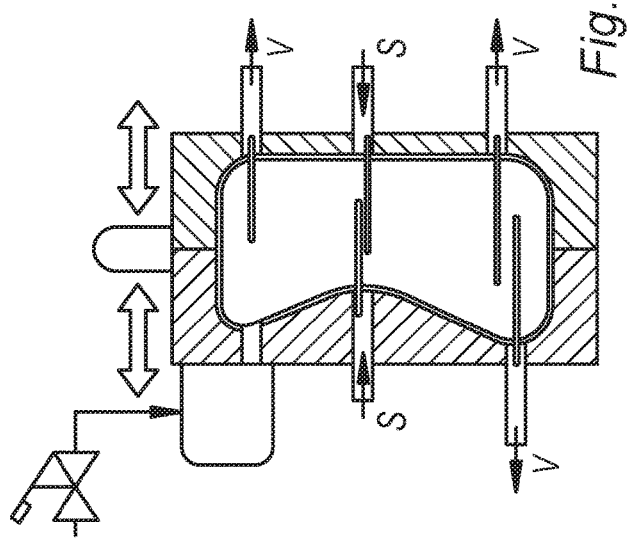

Once the distal region of the cavity is initially filled with beads, then the next set of steam pins is vented as is illustrated in FIG. 15*e* and the filling operation continues zone by zone until the final collection of steam pins proximate the fill gun is vented. Upon the achieving a substantially completely filled with beads, the fill gun closes as will be described in more detail. Subsequently, once closed, all of the steam vents are vented to atmosphere. Once vented to atmosphere, the beads further expand in size from their fill state and grow approximately 3% in volume as the pressure within the cavity cell drops from 25 PSIG to atmospheric pressure. This causes the beads to completely fill the cavity and to be slightly deformed as they contact one another.

Figure 15G:
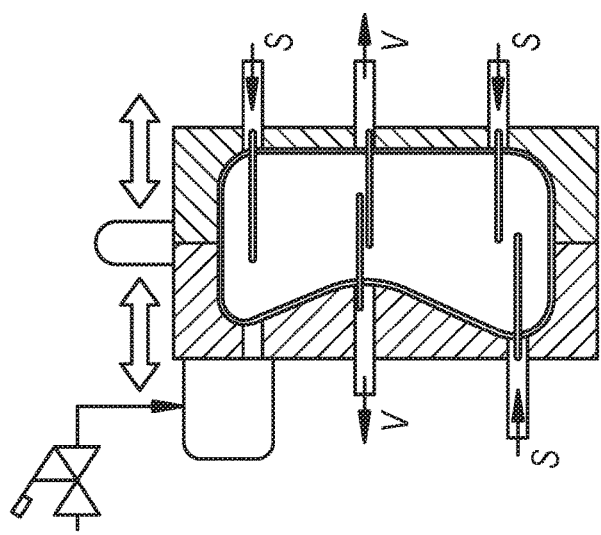

Once the cavity is vented, the bead steaming process will begin one-half of the steam pins will be connected to a steam source while the other half of the steam pins will be connected to the vacuum source or alternatively, connected to atmosphere and the system operated without a vacuum source. After a relatively short time period, the initial steam pins provided with steam will be connected to the vacuum source and the remaining pins will be connected to the steam vent and the steam process will continue until the expanded beads are heated sufficiently to expand and melt together and to bond to the wall of the skin. Following the steam process as illustrated in FIG. 15*g*, the condensate, removal and cooling step begins. One half of the steam pins will be connected to a source of pressurized air while the other half of the steam pins will be vented to atmosphere. Then, the pins originally connected to pressurized air will be vented to atmosphere and the vented pins will be connected to a source of pressurized air. This step removes condensate from the bead steaming from the expanded bead and causes the bead to be cooled. This process continues until the bead has reached the desired temperature, whereupon the steam pin needles are retracted and the mold halves opened so the part can be de-molded as shown in 15*i*. At this point, the foam core controller passes control of the operation back to the blow molding machine controller so that the next part can be formed.

Figure 16D:
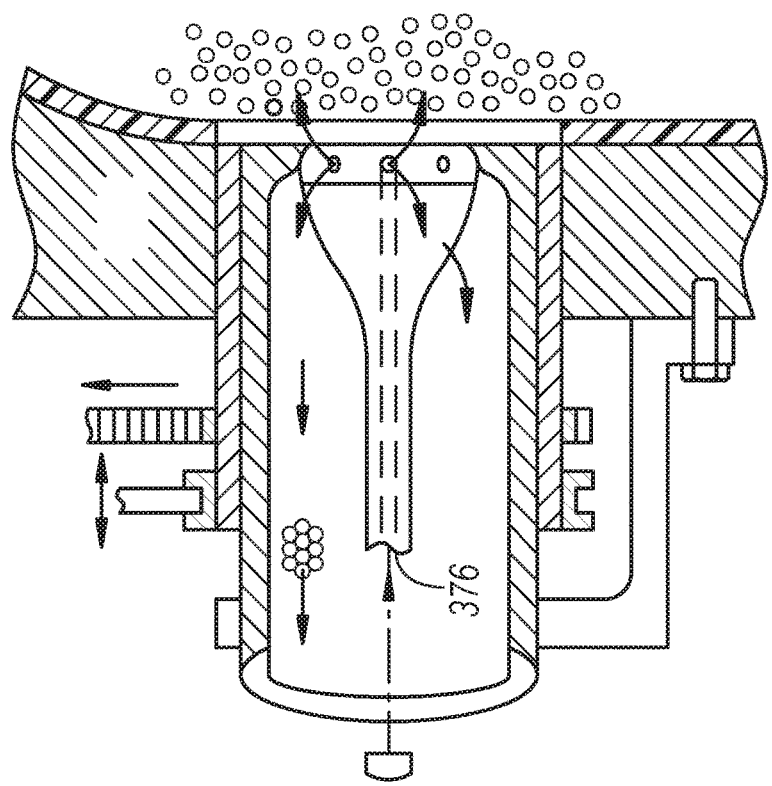

An enlarged schematic illustration of blow gun 330 is shown in FIGS. 16*a*-16*d*, illustrating various states of operation. In FIG. 16*a*, the fill gun is shown in the closed orientation. Blow gun 330 is installed in mold cavity half 312. The fill gun has three main components; a fill tube 358 having a distal end flush with the mold cavity interior wall forming a fill aperture surrounded by frusto conical valve seat 360. An elongate mandrel 362 has a distal end forming a face 364 conforming to the cavity wall when the mold halves are in the closed position and a frusto conical surface 366 which cooperates with frusto conical seat 360 of the fill tube 358 to form a tight seal when the mandrel is moved to the closed position as shown in FIG. 16*a*. When closed, mandrel 362 prevents beads from entering the cavity and the base of the mandrel 364 and the associated face of the distal end of the fill tube 358 conformed to the interior cavity wall of mold half 312 as the plastic parison 304 is blown into a shell conforming to the cavity interior as illustrated in FIG. 16*a*. Preferably, after the plastic shell wall is cooled sufficiently and is maintained in conformity to the mold cavity by the interior gas pressure, a tubular hole saw 368 is operated. The tubular hole saw 368 surrounds fill tube 358 and rotatably fits within a correspondingly sized cylindrical cavity in mold half 312. Tubular hole saw 368 is provided with an external drive gear or sprocket operatively driven by a belt chain or mechanical gear to rotate the saw relative to the mold. A conventional drive 370 can be utilized provided as relatively compact and meets the minimal speed and load requirements of a hole saw. The hole saw is also provided with an actuator mechanism such as a fork operated by a hydraulic or pneumatic cylinder to advance the linear rotating hole saw into the cavity interior as shown in FIG. 16D, cutting a round plug out of the shell wall whereupon the actuator 372 will retract the hole saw and the operation of the drive mechanism can be terminated.

Figure 16C:
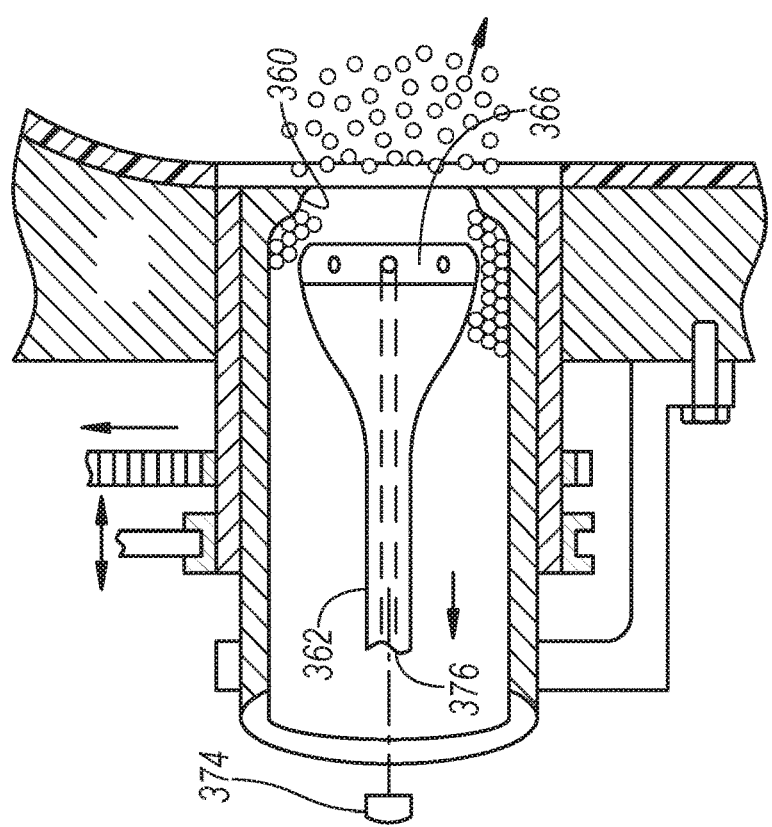

With the hole in the shell formed, the fill process can begin. As shown in FIG. 16*c*, the mandrel 362 is retracted by a linear actuator 374 such as pneumatic or hydraulic cylinder or an electric linear actuator such as ball screw to cause the frusto conical face 366 to lift off of conical seat 360 allowing bead to flow into the interior of the plastic shell. The fill process continues until the plastic shell is completely filled as previously described.

In order to close the fill gun, it is necessary to remove the bead from the region of the conical seat 360 and the corresponding frusto conical face 366. To do so, a tubular passage 376 allows air to be provided to a series of outlet ports in frusto conical face 366, the high pressure blast of air exiting these outlet ports, clears the bead allowing the mandrel to be closed. In order to enable the bead to be blow back out of the fill tube, optionally, the fill valve 336 can be maintained in the open position and the pressure in the tank 334 can be reduced enabling the bead to be pushed back through the fill gun and fill line into the pressure tank 334.

In the embodiment illustrated in FIG. 14, a single pressure tank is provided coupled to a source of bead. If multiple density bead is to be used, it is possible to have multiple pressure tanks, each with its own supply of different density bead coupled to a single fill gun. After a desired amount of the first bead is introduced, the pressure tank can be vented and pressurized air supplied to the mandrel to blow the bead in the fill tube back into the pressure tank, whereupon the pressure tank valve can be closed and the pressure tank valve for a second source of bead of a different density can be connected to the fill gun to continue the filling process. Accordingly, it is possible to build a railroad tie as described previously, having high density beads in the railroad tie ends and a low density bead in the center utilizing a single fill gun and the upper end of the railroad tie as molded, the fill gun alternatively being connected to the two different pressure tanks containing different density bead.

Figure 17:
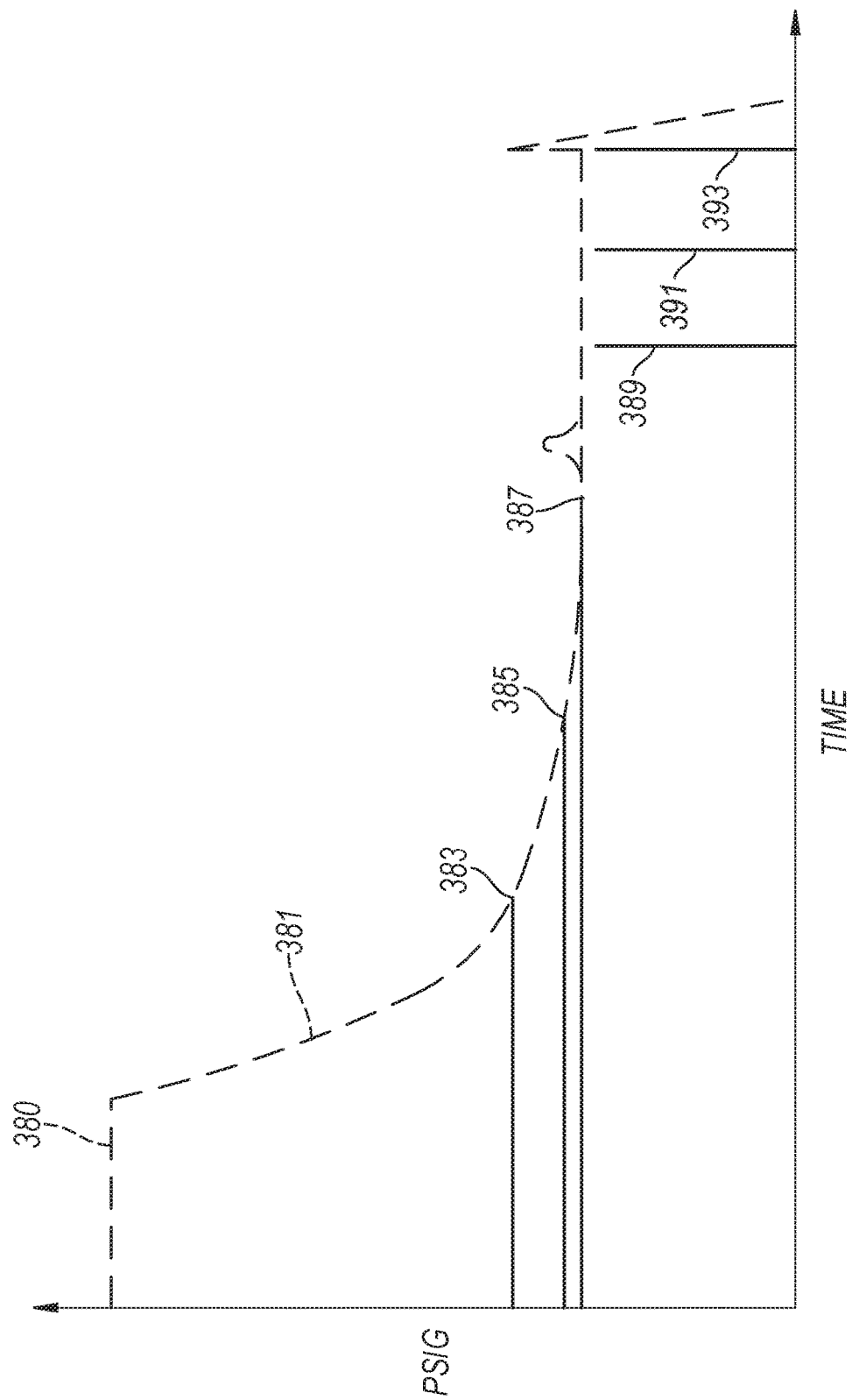
FIG. 17 is a diagram of mold pressure versus time prior to and during the bead fill process.

FIG. 17 is a pressure diagram illustrating the pressure in the mold cavity interior as the part is initially blown, vented and filled with bead. The pressure represented by the dotted line is proportional to the pressure within the mold and pressure will be measured at the steam pin manifold or closer to the mold at the steam pin. During the blowing process, the cavity pressure is at a blow pressure 380 which is about 80-120 PSIG, preferably about 90 PSIG. When the blow cycle is complete, the steam pin vents open causing a rapid pressure drop as illustrated in region 381 of pressure curve. At a selected pressure, in this instance approximately 40 PSIG illustrated at point 383, all the steam pins are closed except for the most distal steam pins allowing the pressure to continue to drop at a reduced rate. At the next selected pressure point 385, which is approximately 30 PSIG, the hole saw cuts the fill hole and retracts. When the pressure drops further and reaches a fill pressure, which in this embodiment, illustrated at approximately 25 PSIG. at point 388 in FIG. 17, the fill gun mandrel opens allowing the bead to introduced into the shell cavity, causing a momentary spike in pressure. After the first most distal zone is filled, the second set of vents open, at point in time 389, allowing filling to continue. The third set of vents at point in time 391. When the cavity is full of bead, the fill gun goes through a clear and close step causing a momentary spike in pressure as illustrated at time 393. During the filling process, the pressure is maintained at the desired fill pressure by regulating the outlet of the manifold using a vent valve controlled by the system controller 332. Once the fill gun is closed, the manifold is fully vented allowing all of the pins to vent.

Figure 18:
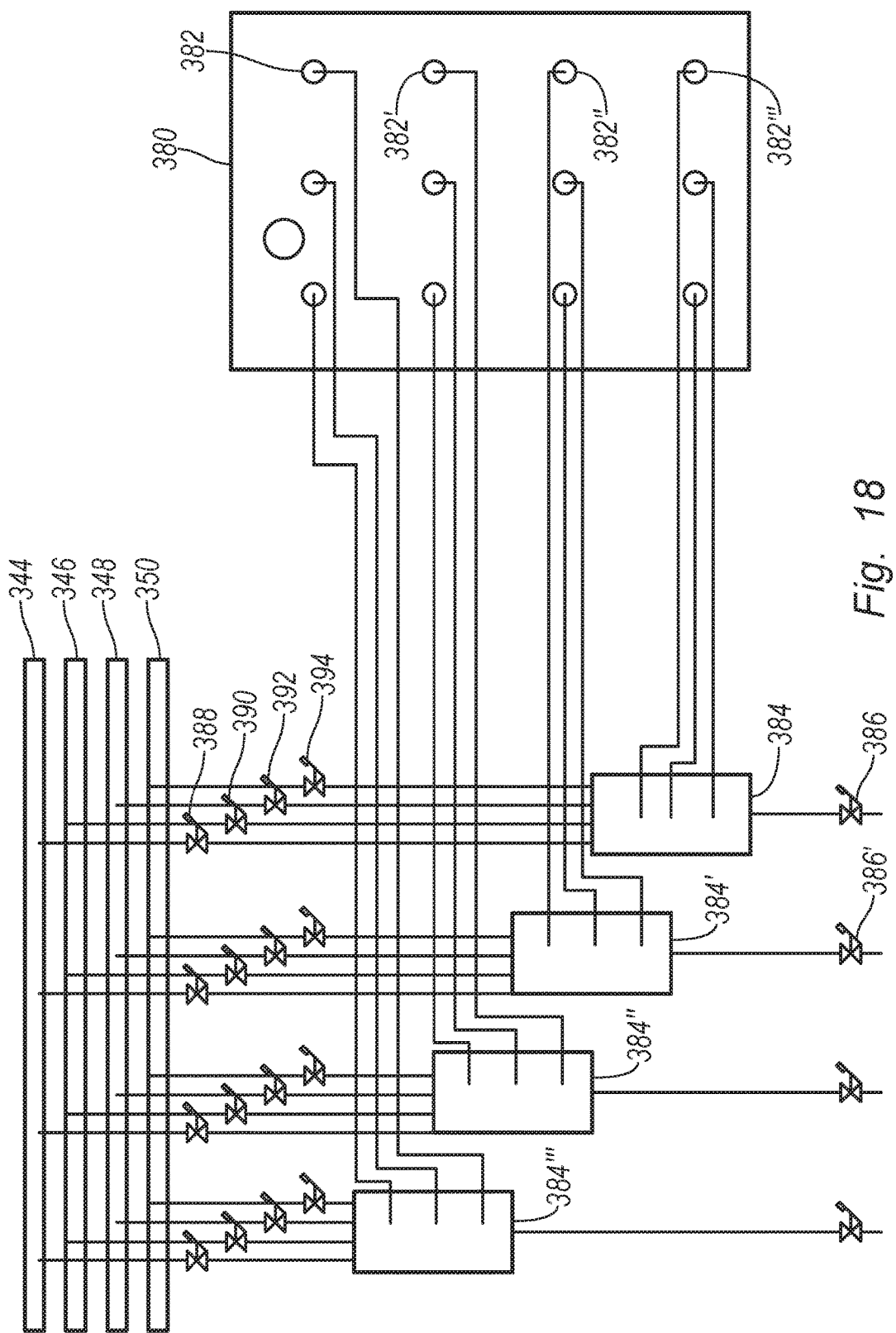
FIG. 18 is a more detailed schematic illustration of the array of steam pins in the mold and the associated manifolds and alternative connections to the air steam vacuum in vent lines.

For the purpose of illustration, FIG. 14 only illustrated two manifolds and a limited number of steam pins. A typical part will require more than two manifolds with a series of steam pins associated with each manifold. Each of these manifold are independently connectable to air, steam, vacuum and vent. FIG. 18 illustrates a mold for an elongate part having a substantial width such as a structural panel. The mold 380 is provided with 12 steam pins 382 oriented in four rows of three with each row representing a zone connected to one of four manifolds 384, 384', 384" and 384'''. Each of the manifolds has an outlet which is preferably located at its lower most point connected to a controllable valve 336 which is regulated by the foam core system controller 332. Each manifold has four inlets in the embodiment illustrated, connected to air source 334, steam source 346, vacuum source 348 and vent 350. As previously noted, it is possible to operate this system without a vacuum source utilizing the vent during the condensate removal process. The inlets in the manifolds are controlled independently by air valve 388, steam valve 390, vacuum valve 392 and vent 394, each operated by the foam core system controller. The corresponding valves for each of the manifolds are also independently controlled by the system controller in the preferred embodiment. Accordingly, a great deal of flexibility in the control of the foam core process is achievable.

One example of the process flexibility obtainable by the previously described structure is illustrated by the preferred steaming process. In order to minimize the amount of condensate introduced into the bead, prior to opening steam valve 346 to introduce steam into the manifold, the outlet valve 386 is opened allowing all of the condensate to drain from the manifold. When steam valve 390 is open, due to the relatively large size of the outlet opening in valve 386, steam will flow rapidly through the manifold and exit, removing any wet steam from the manifold and heating the manifold. Once hot the outlet valve 386 is rapidly closed causing steam to be injected into the bead through the associated steam pin needles. Each manifold is purged and preheated prior to each steaming operation, thereby maximizing the temperature and dryness of the steam introduced in order to heat the bead with the minimum amount of water, which in turn minimizes the amount of drying time necessary to remove the condensate.

Figure 19:
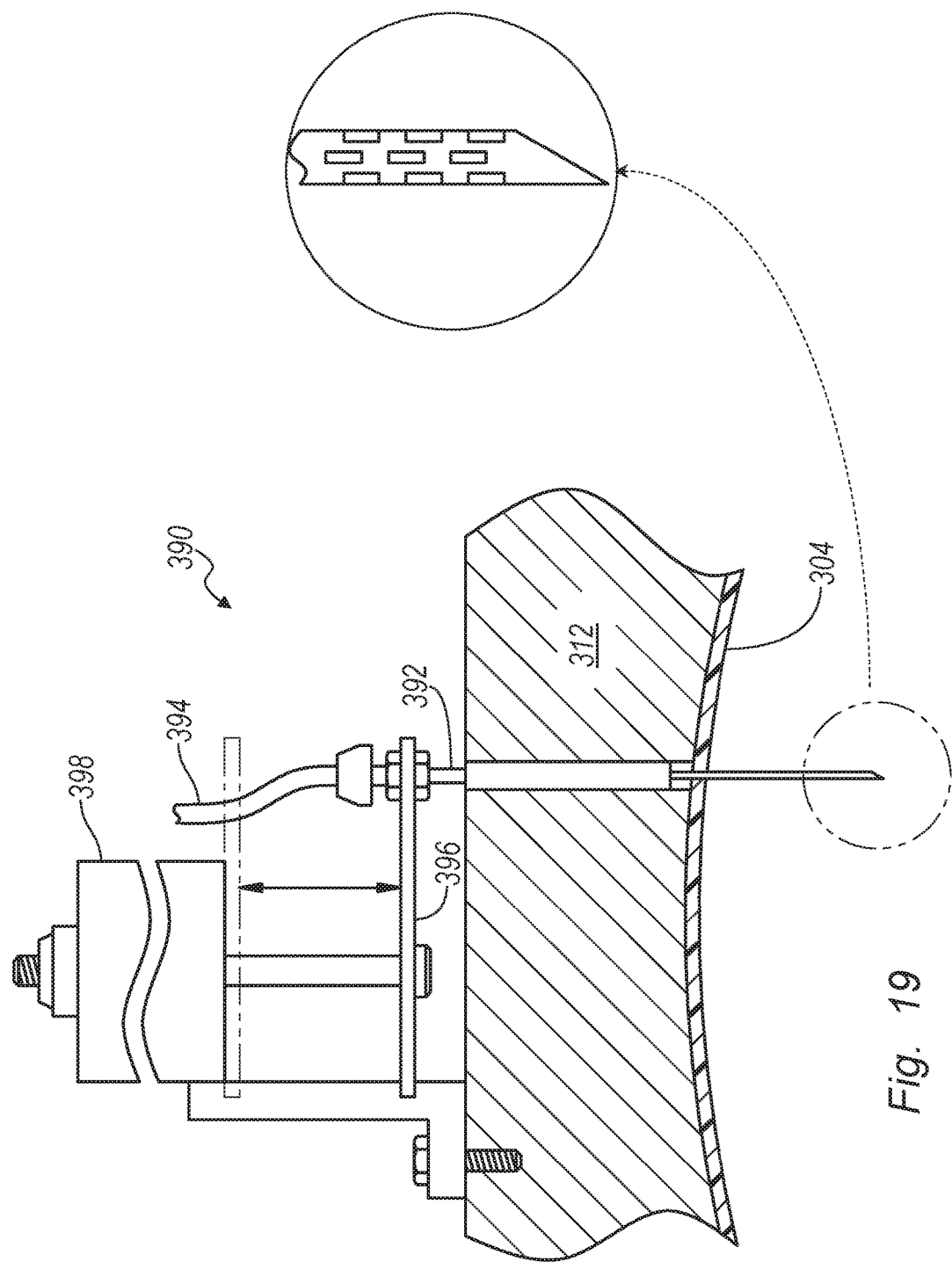
FIG. 19 is a cross-sectional view illustrating a steam pin actuator and an enlarged steam pin tip region.

Preferably, each of the steam pins is provided with a linear actuator to drive the steam pins in and out of the mold cavity. A representative steam pin actuator is illustrated in FIG. 19. Steam pin assembly 390 includes a needle 392 having a distal end which projects into the mold when extended and a proximate end connected to a steam line 394 which is coupled to the manifold. The steam needle 392 is affixed to a support plate 396 which can be shifted between a needle extended position as shown and a needle retracted position illustrated in dotted outline. The support plate 396 is linearly moved by a pneumatic double ended cylinder 398 between two adjustable stop positions. Cylinder 398 is mounted to the mold half 312 by support bracket as illustrated. The tip of the needle as illustrated in the exploded view, has a sharp point and a series of steam ports extending over the portion of the needle that extends through the wall of the plastic shell wall 304, preferably the steam ports in the needle wall end short of the shell 304 wall. Preferably, the steam needle 392 is made of relatively thin wall stainless steel in order to have good corrosion resistance and low thermal mass.

It should be understood that other embodiments may use a heating medium other than steam without exceeding the scope of contemplated embodiments. It is further understood that the expanded polyolefin may be formed using a heating medium in cooperation with a blowing agent, such as pertane.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A foam core system for use with an extrusion blow molding machine which forms an elongated plastic parison which can be blow molded into a hollow shell the shape of a mold cavity, the system comprising:
   a mold formed by a pair of mold halves defining an internal cavity with at least one of the mold halves provided with at least two groups of hollow pins which can be removably inserted into the mold cavity with each of the at least two groups connected to separate manifolds;
   a pressure sensor in communication with the hollow shell;
   a source of expanded plastic bead;
   a reservoir for pressurized expanded plastic bead with an inlet coupled to the source of expanded plastic bead by a reservoir inlet valve and an outlet connected to a fill gun supply valve;
   at least one bead fill gun attached to a mold half to cut a hole in a hollow shell formed within the mold cavity and to selectively coupling the mold cavity to the source of pressurized expanded plastic bead via the fill gun supply valve;
   each of separate manifolds for the at least two groups of hollow pins, is also coupled to at least three valves connected to a source pressurized gas, an at least partially vaporized heating medium and a vent; and a system controller in communication blow molding machine to sequentially operate and control the at least three valves and the fill gun to blow the shell, to insert the hollow pins, cutting at least one fill port in the plastic shell while maintaining the mold cavity pressurized above atmospheric pressure, controlling the hollow shell pressure above atmospheric pressure while filing the mold with bead so as to maintain the expandable polymer beads in a compressed state, to heat the bead sequentially in a plurality of zones, to cool the bead sequentially in a plurality of zones by introducing pressurized gas sequentially through the at least two groups of hollow pins until the bead is cooled, to signal the blow molding machine to expel the completed article and to refill the a reservoir for pressurized expanded plastic bead.

2. The foam core system of claim 1, wherein each of separate manifolds the for at least two groups connected hollow pins, is also coupled to a fourth valve connected to a vacuum source in order to evacuate condensate during a condensate removal and cooling cycle.

3. The foam core system of claim 1, wherein the at least one bead fill gun has a fill tube opening into the mold cavity defining an annular valve seat, and a shiftable mandrel with a valve head forming a mating seat surface, with one of the valve seat and matting surface provided with air passage opening with can be selectively coupled to a pressurized air source to provide pressurized air to clear the seat of bead so that the valve can freely close.

4. A foam core system for use with an extrusion blow molding machine which forms an elongated plastic parison which can be blow molded into a hollow shell the shape of a mold cavity, the system comprising:
   a mold formed by a pair of mold halves defining an internal cavity with at least one of the mold halves provided with at least two groups of hollow pins which can be removably inserted into the mold cavity with each of the at least two groups connected to separate manifolds;
   a pressure sensor in communication with the hollow shell;
   a source of expanded plastic bead;
   a reservoir for pressurized expanded plastic bead with an inlet coupled to the source of expanded plastic bead by a reservoir inlet valve and an outlet connected to a fill gun supply valve;
   at least one bead fill gun attached to a mold half to cut a hole in a hollow shell formed within the mold cavity and to selectively coupling the mold cavity to the source of pressurized expanded plastic bead via the fill gun supply valve;
   each of separate manifolds for the at least two groups of hollow pins, is also coupled to at least three valves connected to a source pressurized gas, an at least partially vaporized heating medium and a vent; and
   a system controller in communication blow molding machine to sequentially operate and control recited valves and the fill gun to blow the shell, insert the hollow pins, cut an opening in the shell, control the hollow shell pressure while filing the mold with bead, to heat the bead sequentially in a plurality of zones, to cool the bead sequentially in a plurality of zones, to signal the blow molding machine to expel the completed article and to refill the a reservoir for pressurized expanded plastic bead;
   wherein each of separate manifolds the for at least two groups connected hollow pins, is also coupled to a fourth valve connected to a vacuum source in order to evacuate condensate during a condensate removal and cooling cycle.

5. The foam core system of claim 4, wherein the at least one bead fill gun has a fill tube opening into the mold cavity defining an annular valve seat, and a shiftable mandrel with a valve head forming a mating seat surface, with one of the valve seat and matting surface provided with air passage opening with can be selectively coupled to a pressurized air source to provide pressurized air to clear the seat of bead so that the valve can freely close.

6. The foam core system of claim 4, wherein the sequentially operation of the system controller to cut an opening in the shell further comprises cutting at least one fill port in the plastic shell while maintaining the mold cavity pressurized above atmospheric pressure.

7. The foam core system of claim 4, wherein the sequentially operation of the system controller to control the hollow shell pressure further comprises controlling the hollow shell pressure above atmospheric pressure while filing the mold with bead so as to maintain the expandable polymer beads in a compressed state.

8. A foam core system for use with an extrusion blow molding machine which forms an elongated plastic parison which can be blow molded into a hollow shell the shape of a mold cavity, the system comprising:
   a mold formed by a pair of mold halves defining an internal cavity with at least one of the mold halves provided with at least two groups of hollow pins which can be removably inserted into the mold cavity with each of the at least two groups connected to separate manifolds;
   a pressure sensor in communication with the hollow shell;
   a source of expanded plastic bead;
   a reservoir for pressurized expanded plastic bead with an inlet coupled to the source of expanded plastic bead by a reservoir inlet valve and an outlet connected to a fill gun supply valve;
   at least one bead fill gun attached to a mold half to cut a hole in a hollow shell formed within the mold cavity and to selectively coupling the mold cavity to the source of pressurized expanded plastic bead via the fill gun supply valve;
   each of separate manifolds for the at least two groups of hollow pins, is also coupled to at least three valves connected to a source pressurized gas, an at least partially vaporized heating medium and a vent; and
   a system controller in communication blow molding machine to sequentially operate and control recited valves and the fill gun to blow the shell, to insert the hollow pins, cut an opening in the shell, control the hollow shell pressure while filing the mold with bead, to heat the bead sequentially in a plurality of zones, to cool the bead sequentially in a plurality of zones, to signal the blow molding machine to expel the completed article and to refill the a reservoir for pressurized expanded plastic bead;
   wherein the at least one bead fill gun has a fill tube opening into the mold cavity defining an annular valve seat, and a shiftable mandrel with a valve head forming a mating seat surface, with one of the valve seat and matting surface provided with air passage opening with can be selectively coupled to a pressurized air source to provide pressurized air to clear the seat of bead so that the valve can freely close.

9. The foam core system of claim 8, wherein each of separate manifolds the for at least two groups connected hollow pins, is also coupled to a fourth valve connected to a vacuum source in order to evacuate condensate during a condensate removal and cooling cycle.

10. The foam core system of claim 8, wherein the sequentially operation of the system controller to cut an opening in the shell further comprises cutting at least one fill port in the plastic shell while maintaining the mold cavity pressurized above atmospheric pressure.

11. The foam core system of claim 8, wherein the sequentially operation of the system controller to control the hollow shell pressure further comprises controlling the hollow shell pressure above atmospheric pressure while filing the mold with bead so as to maintain the expandable polymer beads in a compressed state.

* * * * *

UNITED STATES PATENT AND TRADEMARK OFFICE
CERTIFICATE OF CORRECTION

| | |
|---|---|
| PATENT NO. | : 10,391,700 B2 |
| APPLICATION NO. | : 15/133929 |
| DATED | : August 27, 2019 |
| INVENTOR(S) | : Richard W. Roberts |

It is certified that error appears in the above-identified patent and that said Letters Patent is hereby corrected as shown below:

In the Claims

Column 15, Lines 7-8, Claim 1:
After "above atmospheric pressure while"
Delete "filing" and
Insert -- filling --.

Column 15, Line 15, Claim 1:
After "and to refill"
Delete "the".

Column 15, Line 18, Claim 2:
After "separate manifolds"
Delete "the for" and
Insert -- for the --.

Column 15, Line 27, Claim 3:
After "valve seat and"
Delete "matting" and
Insert -- mating --.

Column 15, Lines 27-28, Claim 3:
After "air passage opening"
Delete "with" and
Insert -- which --.

Column 15, Line 60, Claim 4:
After "hollow shell pressure while"
Delete "filing" and
Insert -- filling --.

Signed and Sealed this
Twenty-first Day of April, 2020

Andrei Iancu
*Director of the United States Patent and Trademark Office*

CERTIFICATE OF CORRECTION (continued)
U.S. Pat. No. 10,391,700 B2

Column 15, Lines 63-64, Claim 4:
After "the completed article and to refill"
Delete "the".

Column 15, Line 66, Claim 4:
After "wherein each of separate manifolds"
Delete "the for" and
Insert -- for the --.

Column 16, Line 8, Claim 5:
After "valve seat and"
Delete "matting" and
Insert -- mating --.

Column 16, Lines 8-9, Claim 5:
After "air passage opening"
Delete "with" and
Insert -- which --.

Column 16, Line 20, Claim 7:
After "atmospheric pressure while"
Delete "filing" and
Insert -- filling --.

Column 16, Line 52, Claim 8:
After "hollow shell pressure while"
Delete "filing" and
Insert -- filling --.

Column 16, Lines 55-56, Claim 8:
After "completed article and to refill"
Delete "the".

Column 16, Lines 61-62, Claim 8:
After "with one of the valve seat and"
Delete "matting" and
Insert -- mating --.

Column 16, Line 62, Claim 8:
After "air passage opening"
Delete "with" and
Insert -- which --.

Column 16, Lines 66-67, Claim 9:
After "wherein each of separate manifolds"
Delete "the for" and

CERTIFICATE OF CORRECTION (continued)
U.S. Pat. No. 10,391,700 B2

Insert -- for the --.

Column 17, Line 12, Claim 11:
After "above atmospheric pressure while"
Delete "filing" and
Insert -- filling --.